US012316259B2

(12) United States Patent
Mohan et al.

(10) Patent No.: US 12,316,259 B2
(45) Date of Patent: May 27, 2025

(54) FAST DECELERATION OF PMSM AND BLDC MOTORS USING RECIRCULATION BRAKING

(71) Applicant: TEXAS INSTRUMENTS INCORPORATED, Dallas, TX (US)

(72) Inventors: Sivabalan Mohan, Bangalore (IN); Venkata Pavan Mahankali, Bangalore (IN); Prasad Kulkarni, Bengaluru (IN); Ganapathi Hegde, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 636 days.

(21) Appl. No.: 17/577,093

(22) Filed: Jan. 17, 2022

(65) Prior Publication Data

US 2022/0393631 A1  Dec. 8, 2022

(30) Foreign Application Priority Data

May 29, 2021  (IN) .............................. 202141023969

(51) Int. Cl.
*H02P 27/08*    (2006.01)
*H02P 3/18*     (2006.01)
*H02P 6/24*     (2006.01)

(52) U.S. Cl.
CPC ................ *H02P 27/08* (2013.01); *H02P 3/18* (2013.01)

(58) Field of Classification Search
CPC ............... H02P 27/08; H02P 3/18; H02P 6/24
See application file for complete search history.

(56) References Cited

U.S. PATENT DOCUMENTS

| | | | | |
|---|---|---|---|---|
| 8,278,860 | B2 * | 10/2012 | Brown ..................... | H02P 6/185 318/599 |
| 10,097,115 | B2 * | 10/2018 | Qian ........................ | H02P 6/182 |
| 10,594,237 | B2 * | 3/2020 | Buckley .................... | H02P 6/17 |
| 11,374,514 | B2 * | 6/2022 | Vanko ....................... | G01P 3/48 |
| 2008/0116834 | A1 * | 5/2008 | Namuduri ............. | B62D 5/008 318/432 |
| 2020/0287482 | A1 * | 9/2020 | Yoneda .................... | B25F 5/00 |
| 2021/0203257 | A1 * | 7/2021 | Lakshmi Narasimha ................... | H02P 6/20 |

\* cited by examiner

*Primary Examiner* — Thai T Dinh
(74) *Attorney, Agent, or Firm* — Mandy Barsilai Fernandez; Frank D. Cimino

(57) ABSTRACT

A motor control system operable to control a motor includes a motor control circuit and an inverter circuit connected to the motor control circuit and configured to connect to the motor at phase output terminals. The inverter circuit, in response to one or more output control signals indicating a deceleration instruction from the motor control circuit, implements a multi-state deceleration sequence for at least one commutation state of a commutation scheme of the motor.

14 Claims, 20 Drawing Sheets

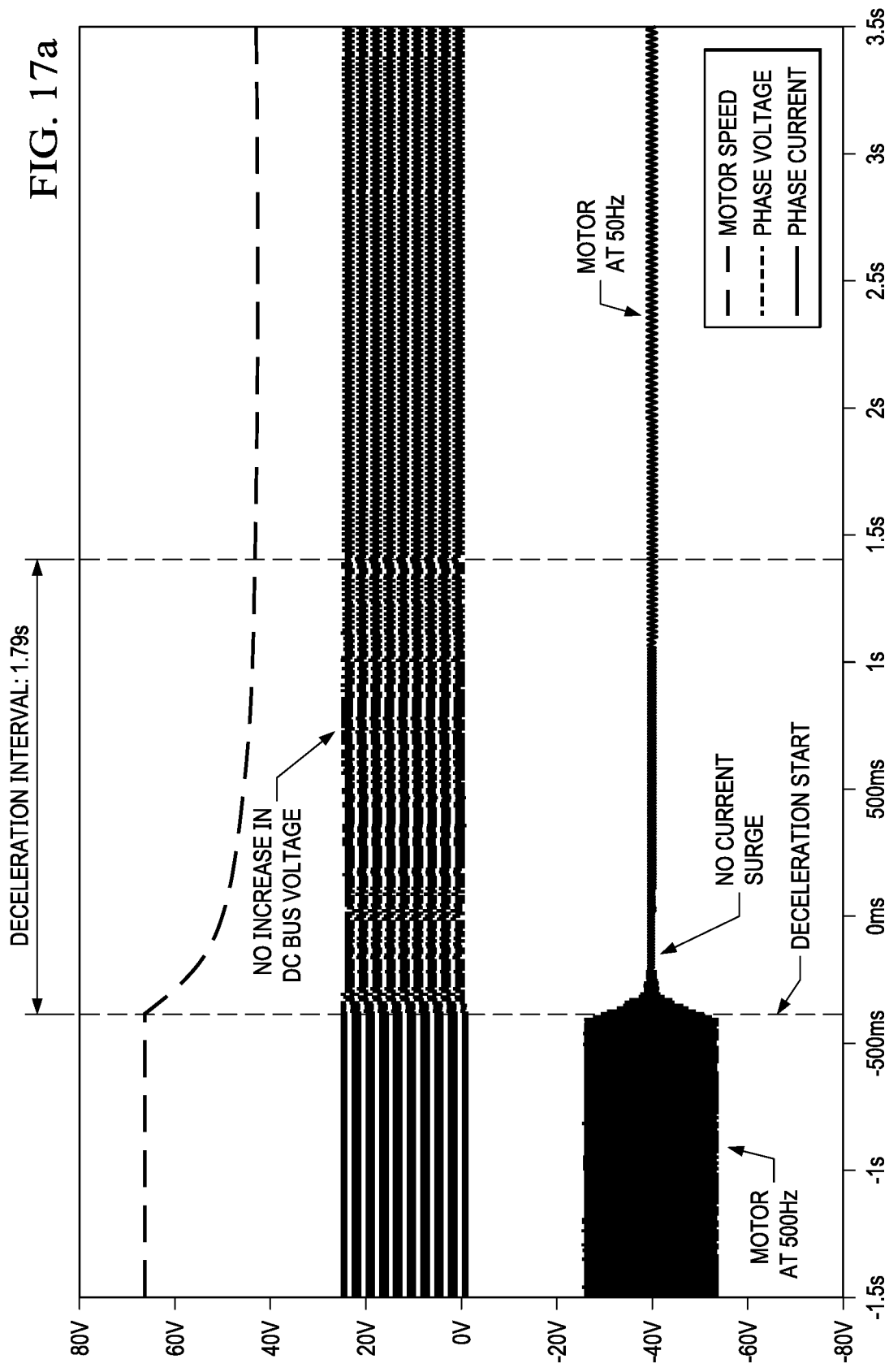

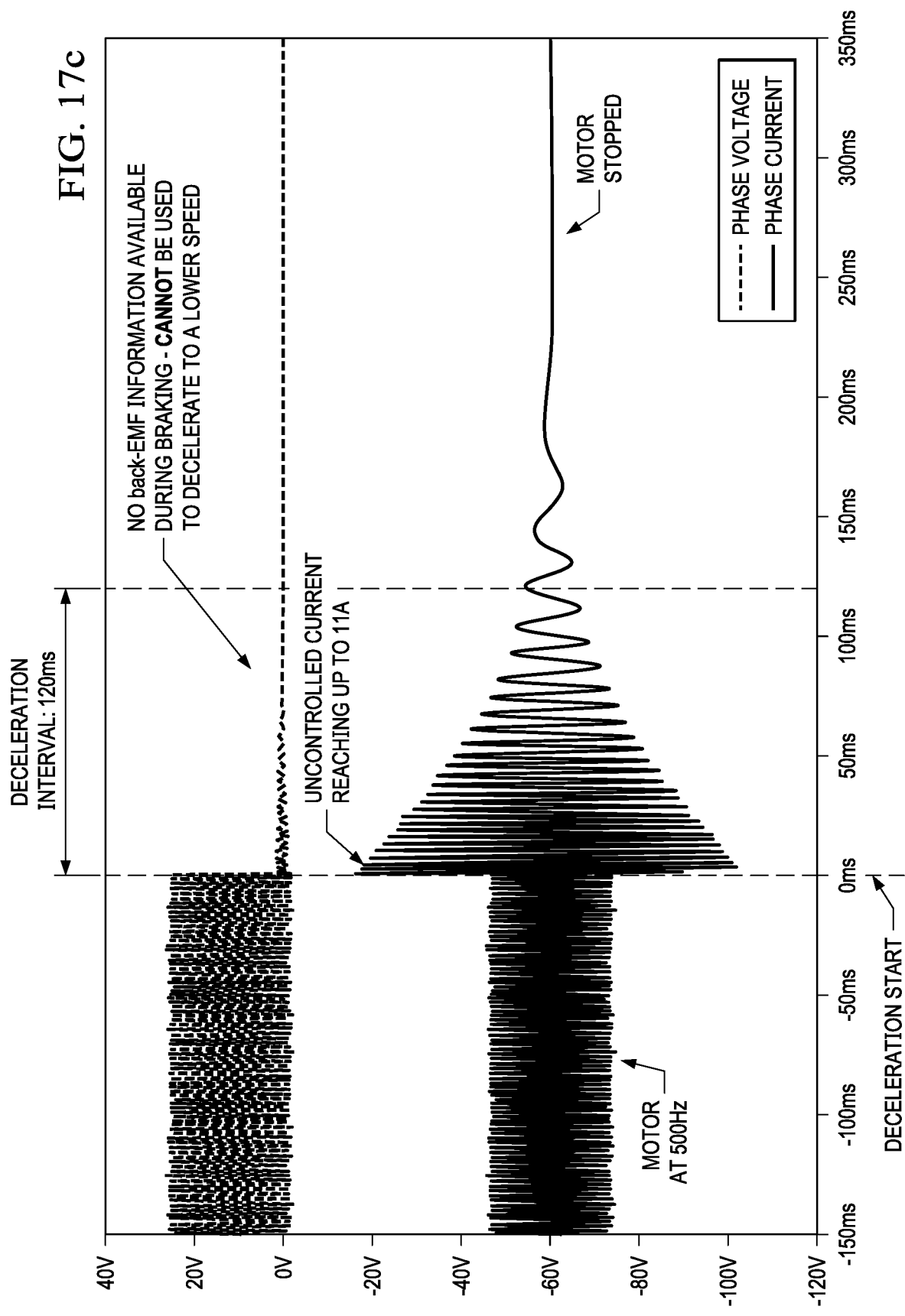

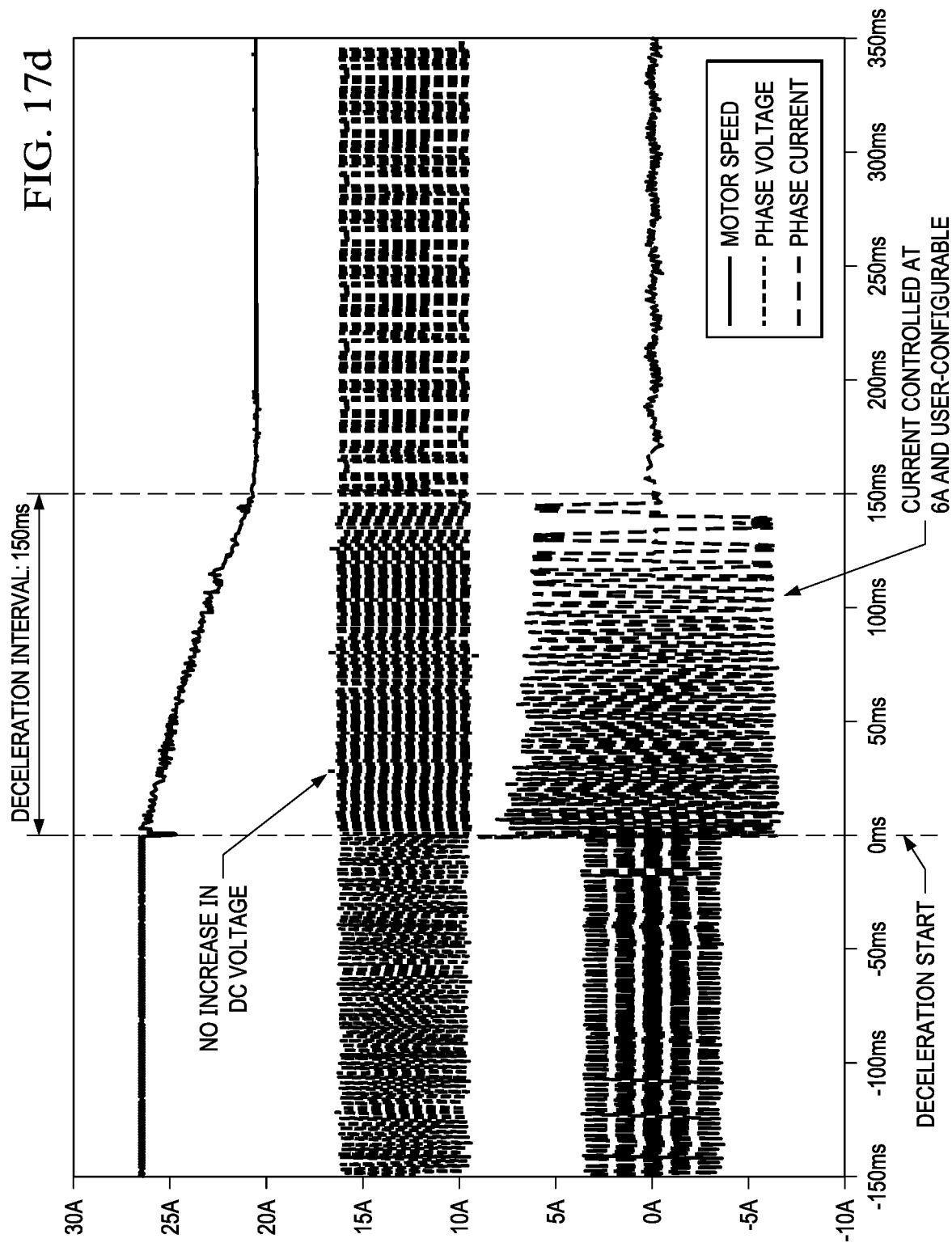

_US 12,316,259 B2_

FAST DECELERATION OF PMSM AND BLDC MOTORS USING RECIRCULATION BRAKING

BACKGROUND

Electric motors include a rotor and a stator having a plurality of windings. Brushless direct current (BLDC) motors are electronically commutated, wherein solid-state switching replaces the brushes and segmented commutators of traditional permanent magnet DC motors. In BLDC motors, the rotor is or includes a permanent magnet. These permanent magnet BLDC motors operate by sequentially energizing the stator windings to attract or repel the permanent magnet rotor into rotational motion. Sensor-less BLDC motors often rely on back electromotive force (BEMF) detection to determine the angular position of the permanent magnet rotor.

A permanent magnet synchronous motor (PMSM) is an AC synchronous motor whose field excitation is provided by permanent magnets and that has a sinusoidal back EMF waveform. The permanent magnets enable the PMSM to generate torque at zero speed. Both PMSM and BLDC motors can usually be driven with a six-step commutation. Commutation is the changing of the motor phase currents (e.g., current through the stator windings) at the appropriate timing to produce rotational torque.

SUMMARY

In one example, a motor control system operable to control a motor includes a motor control circuit and an inverter circuit connected to the motor control circuit and configured to connect to the motor at phase output terminals. The inverter circuit, in response to one or more output control signals indicating a deceleration instruction from the motor control circuit, implements a multi-state deceleration sequence for at least one commutation state of a commutation scheme of the motor.

In one example, a motor control system includes a motor control circuit and an inverter circuit connected to the motor control circuit via a plurality of output control terminals. The inverter circuit includes three bridge arm circuits connected in parallel with one another that each comprise a phase output terminal configured to connect to a respective phase winding of a three-phase motor. The three bridge arm circuits include a pair of series-connected switches having control terminals connected to respective ones of the output control terminals of the motor control circuit. The motor control circuit outputs control signals on the plurality of output control terminals to implement a multi-state deceleration cycling scheme for at least one commutation state of a normal motoring operation mode upon receipt of a deceleration instruction.

In one example, a method for performing a rapid, controlled deceleration of a motor includes receiving a deceleration indication during a commutation state of a motoring mode of operation of the motor, and performing a multi-state decelerating cycling sequence comprising multiple states as unique 2-phase voltage vectors based on the commutation state of the motoring mode of operation.

BRIEF DESCRIPTION OF THE DRAWINGS

FIG. 17a is a waveform diagram illustrating waveforms associated with a single-ended, asynchronous, PWM deceleration technique.

FIG. 17c is a waveform diagram illustrating waveforms associated with a hard braking deceleration technique.

FIG. 17d is a waveform diagram illustrating waveforms associated with a multi-state deceleration cycling sequence according to the disclosure.

Figure 1:
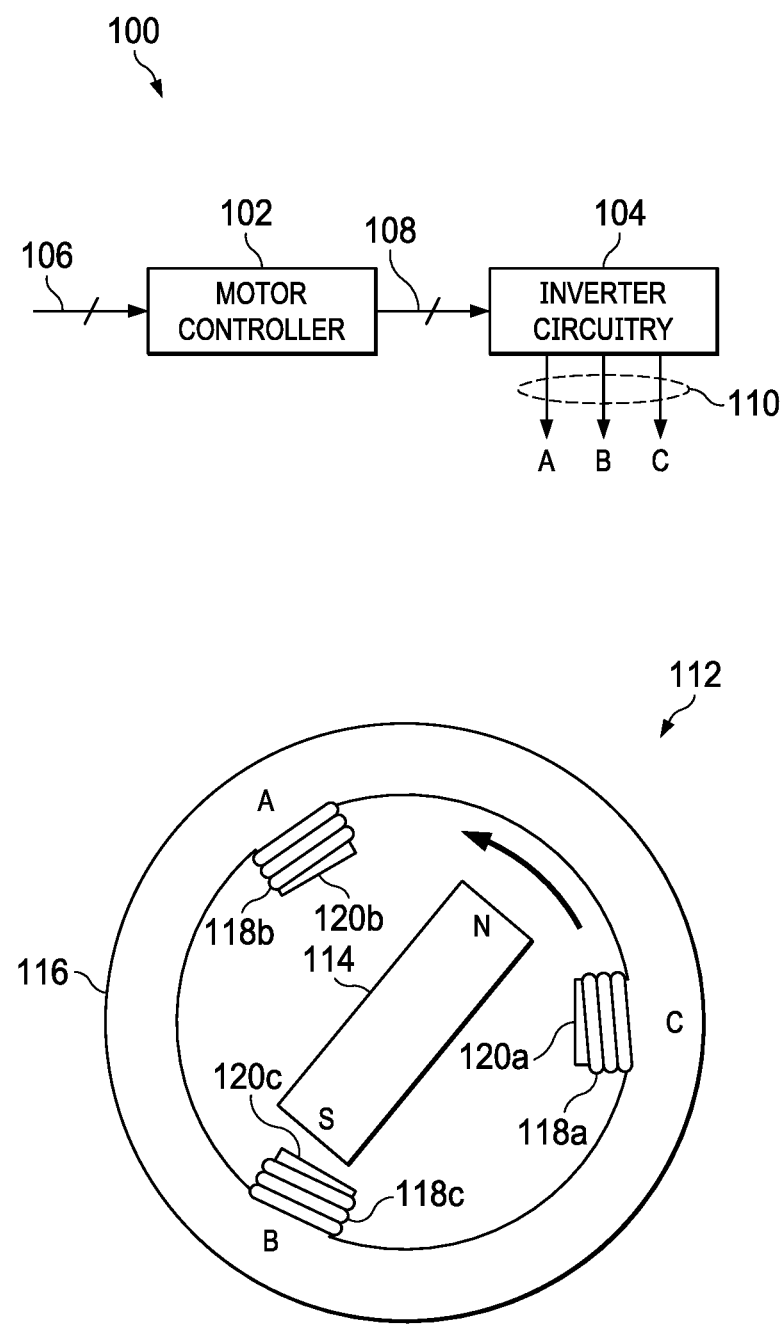
FIG. 1 is a schematic diagram of an example motor system which includes a motor control circuit, inverter circuitry, and a motor controller.

The same reference numbers or other reference designators are used in the drawings to designate the same or similar (functionally and/or structurally) features. Some features illustrated in the drawings that are designated with a reference number that includes the same last two digits may be the same or equivalent to the other features with the same last two digits (such as transistors 222, 522, 722, 822, 1022, 1122, 1222 and 1522).

DETAILED DESCRIPTION

Described herein are motor circuits, systems and methods of performing a rapid, controlled deceleration of motors, such as BLDC ad PMSM motors. Such motor control includes a multi-state deceleration sequence for each motoring commutation state, thereby resulting in at least a braking state and a brief regeneration state. In one particular example, the multi-state deceleration sequence includes a braking state that generates a motor winding current of a polarity that is opposite to the back-EMF voltage to create a negative, or decelerating, torque. In a 4-state deceleration sequence, the braking state generates a rapid increase in motor winding current, which is then recirculated within the inverter switches in a second, bottom-side recirculation state, followed by a regeneration state, and then a top-side recirculation state. The multi-state sequence is repeated until the motor speed reaches its new, lower speed or until the next commutation state is reached, at which point an equivalent multi-state deceleration sequence is employed for the new commutation state. The process repeats for each of the commutation states until the target, reduced motor speed is obtained.

In order to best understand the context in which the present disclosure resides, a brief description of a motor control driving scheme is discussed below. FIG. 1 is a hybrid diagram illustrating an example motor control system 100 in which the present disclosure may operate. The motor control system 100 includes a motor control circuit (e.g., a motor controller) 102 that is operationally coupled to inverter circuitry 104. The motor control circuit 102 may comprise circuitry that executes a specified control scheme (such as that described herein). Motor control circuit 102 may include a state machine, application specific integrated circuitry (ASIC), a processor, a microcomputer, a microcontroller, memory, digital logic circuitry, field programmable gate array (FPGA), analog circuitry and/or software to execute a specific control routine such as that described herein. The motor control circuit 102 receives one or more control input signals 106 at one or more input control terminals. Such control signals may include, inter alia, a power ON/OFF signal, a motoring signal to indicate a normal motor drive mode, a motor rapid deceleration signal to indicate a rapid deceleration mode, and a motor speed input signal that indicates the desired motor speed.

The motor control circuit 102 has one or more output control signals 108 at one or more output terminals that are connected to the inverter circuitry 104. More particularly, the one or more output control signals 108 drive the various switches (e.g., MOS transistors such a n-channel MOS transistors) to supply the appropriate motor phase currents at the appropriate phase outputs 110, that are labelled phases A, B and C in FIG. 1, for example. In some examples, the "A" phase signal (e.g. a voltage and/or current) is supplied by inverter 104 to the stator windings 118*b* of motor 112. Similarly, the "B" phase signal is applied to windings 118*c*, and the "C" phase signal is applied to windings 118*a*.

FIG. 1 further shows a motor 112 that is driven by the motor control system 100. The motor 112 is a non-limiting example of a motor such as a BLDC or a PMSM type motor, and includes a rotor 114 and a stator 116. The rotor 114 includes a permanent magnet having a north pole (N) and a south pole (S). The rotor 114 is configured to rotate about an axis (in this example, the axis is into the page and at the center of the rotor 114).

The stator 116 includes a plurality of windings 118*a*, 118*b*, and 118*c* that surround a plurality of cores 120*a*, 120*b*, and 120*c*, respectively. The plurality of windings 118*a*-118*c* are coupled to the motor control system 100 (e.g., specifically the phase outputs 110 of the inverter circuitry 104). Thus, the phase outputs 110 may include three separate terminals with each terminal coupled to different windings (such as windings 118*a*-118*c* of the motor 112). Current(s) passes through the windings 118*a*-118*c* in a sequential manner to excite the motor 112 to cause the rotor 114 to rotate. For example, when current passes through the various windings 118*a*-118*c*, a magnetic field is generated that surrounds the windings. The magnetic fields generated around each of the windings together have a net direction of magnetization that operates to rotate the rotor 114 about its axis.

Figure 2:
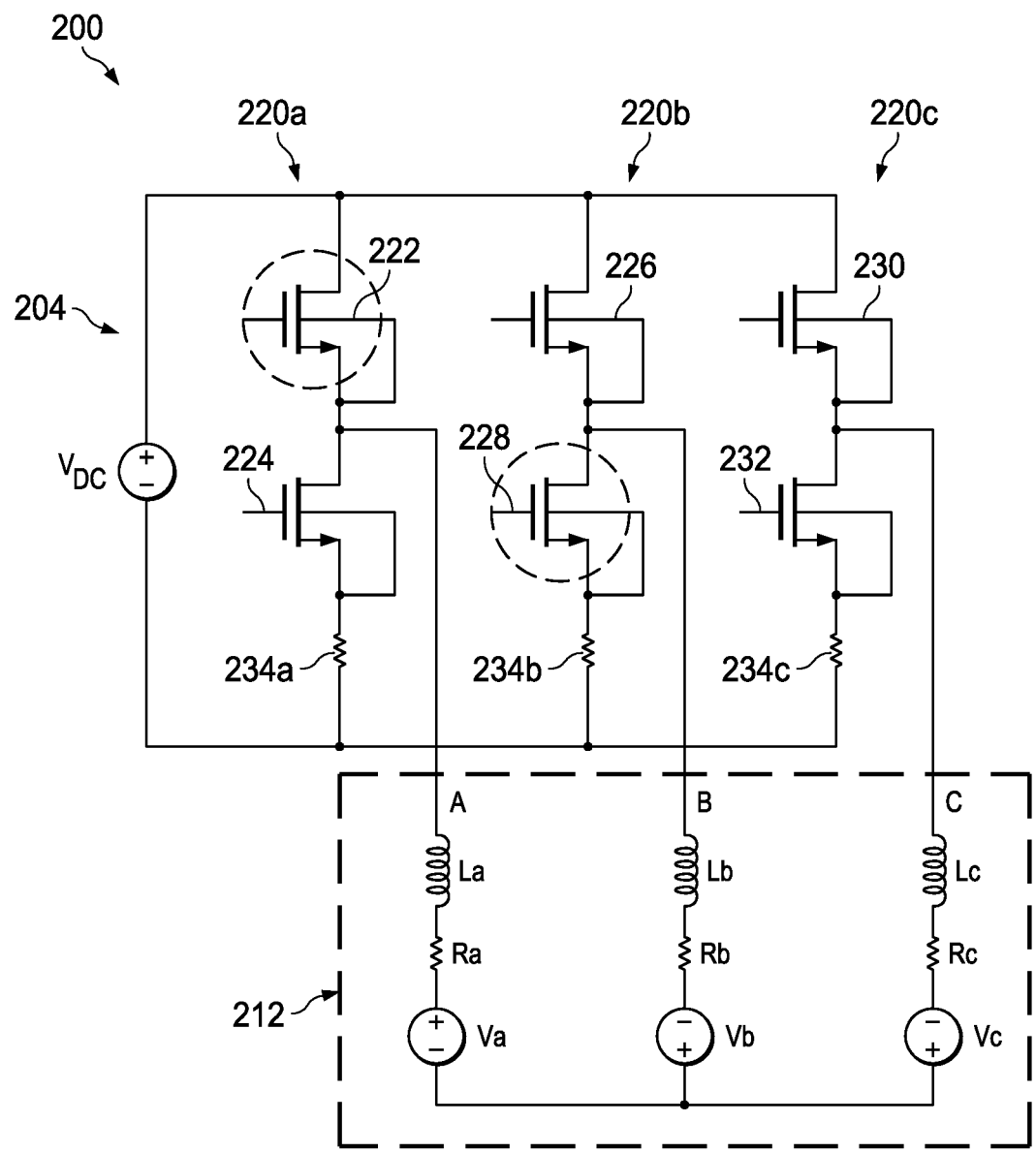
FIG. 2 is a schematic of an example inverter circuit connected to a schematic representation of a motor.

FIG. 2 illustrates a circuit diagram 200 of inverter circuitry 204 (e.g., an implementation of inverter circuitry 104 of FIG. 1) connected to an equivalent circuit diagram of the motor 212 (e.g., an equivalent circuit of motor 112 of FIG. 1), according to one example aspect of the disclosure. The inverter circuitry 204, in one example, comprises three pairs of series-connected switches 222 and 224; 226 and 228; and 230 and 232 that each form a respective bridge arm 220*a*, 220*b* and 220*c* that drives a respective phase A, B and C of the motor 212. In the example of FIG. 2, each of the switches are n-channel MOSFETs (nMOSFETs or nMOS devices), however, p-channel MOSFETs (pMOSFET or pMOS devices), bipolar transistors (BJTs), or any other type of switching circuity element may be employed and is contemplated by this disclosure. Each of the switches have a control terminal, for example, a gate terminal for the MOSFET devices, that are operatively coupled to the motor control circuit (e.g., motor control circuit 102 of FIG. 1) via the output control signals 108 to selectively activate and deactivate the various switches in the inverter circuitry 204. In addition, each bridge arm 220*a*-220*c* contains a resistor 234*a*, 234*b* and 234*c* connected in series with its respective pair of series-connected switches. The resistors 234*a*-234*c* operate, in one example, as sense resistors to sense the motor winding current in the respective phases via, for example, an analog-to-digital converter (ADC) sampling circuit, as discussed below. Such currents may be employed in sensor-less motor control schemes to estimate the rotor location for commutation control, and, as will be more fully appreciated herein, are used to trigger various states in the multi-state deceleration cycling sequence of the present disclosure.

The motor 212, in one example, is a three-phase motor with the phases being designated, for example, A, B and C, respectively. Each phase winding has an effective inductance Lx and an effective phase resistance Rx that represents the complex impedance of each winding. Each winding also has a phase back-EMF Vx (where "x" represents the "a" phase, "b" phase or "c" phase), as shown.

Figure 3:
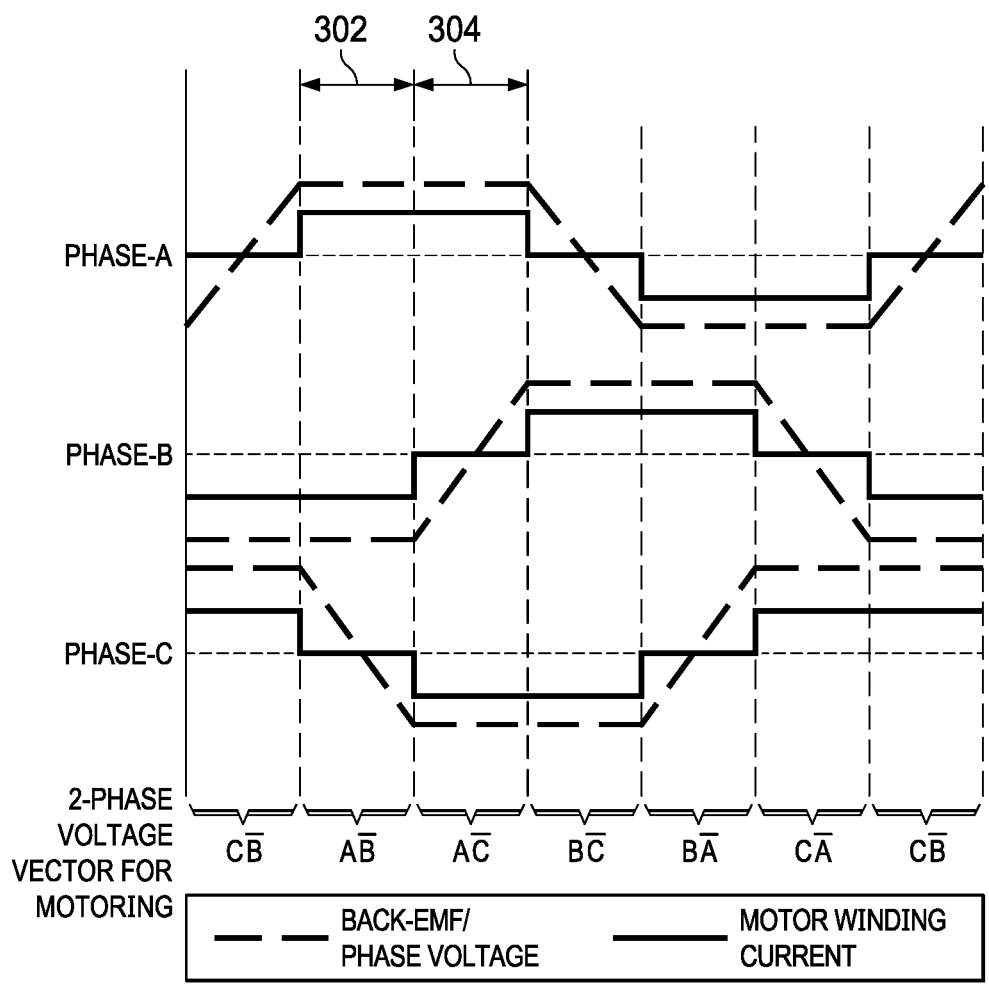
FIG. 3 is a waveform diagram illustrating phase voltage waveforms of a three-phase motor undergoing six-step trapezoidal commutation.
Figure 4:
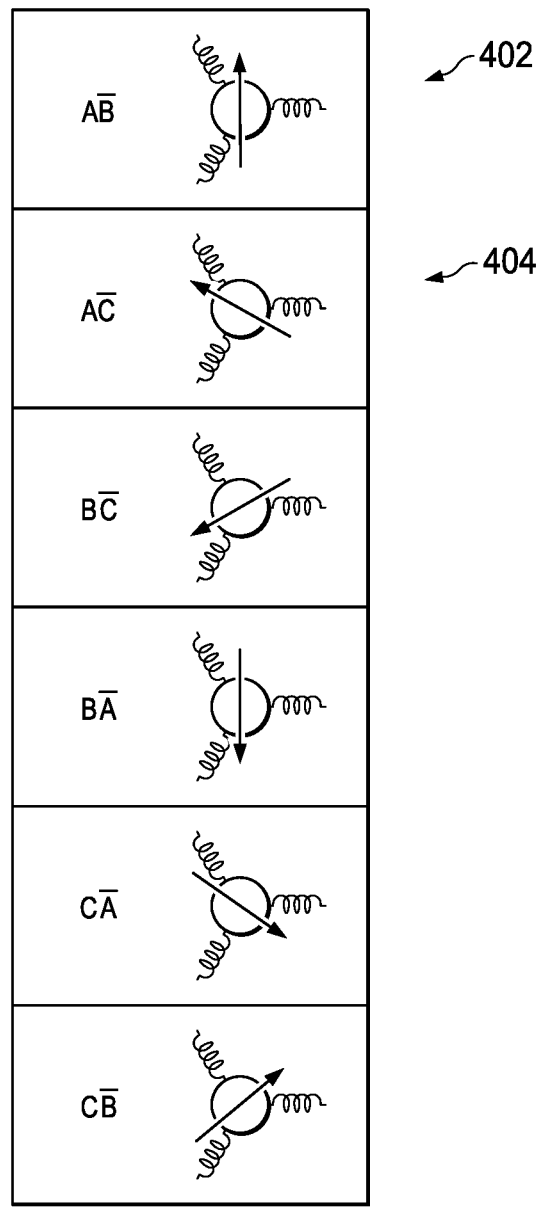
FIG. 4 is table illustrating rotor example positions for each of the six states in a six-state commutation scheme.

Referring to FIGS. 2, 3 and 4 generally, a six-state trapezoidal commutation scheme is one methodology for driving a motor. In such trapezoidal commutation, 2-phase voltage vectors are applied from the motor control circuit 102 of FIG. 1 to the inverter circuitry 204 of FIG. 2 congruent to the phase back-EMF polarity to generate positive or "motoring" torque. The typical 2-phase voltage vectors with respect to the back-EMF polarity for a "normal" motoring mode or operation are illustrated in FIGS. 3-4. In FIGS. 3-4 $A\overline{B}$ represents a 2-phase voltage vector, and means that the top MOSFET in phase A (e.g., switch 222) and the bottom MOSFET in phase B (e.g., switch 228) are turned on (e.g., the control signals to the gate terminals of transistors 222 and 228 are high), while the remaining switches 224, 226, 230 and 232 are turned off (e.g., the control signals to the gate terminals of the transistors 224, 226, 230 and 232 are low). In FIG. 2, the transistors are illustrated as being activated or "on" by the dashed line encircling the respective transistor.

Referring to the waveform diagram of FIG. 3, it can be seen that when the phase A back-EMF is positive, a positive phase A voltage is applied (i.e., by turning on the top MOSFET 222 in the phase A bridge arm 220*a*). Consequently, as illustrated in the time interval 302, when the phase A back-EMF is positive and the phase B back-EMF is negative (and the phase C back-EMF is transitioning from positive to negative), the applied 2-phase voltage vector for motoring operation is $A\bar{B}$. During this time interval 302, the rotor position is between windings as shown in FIG. 4 at 402.

Figure 5:
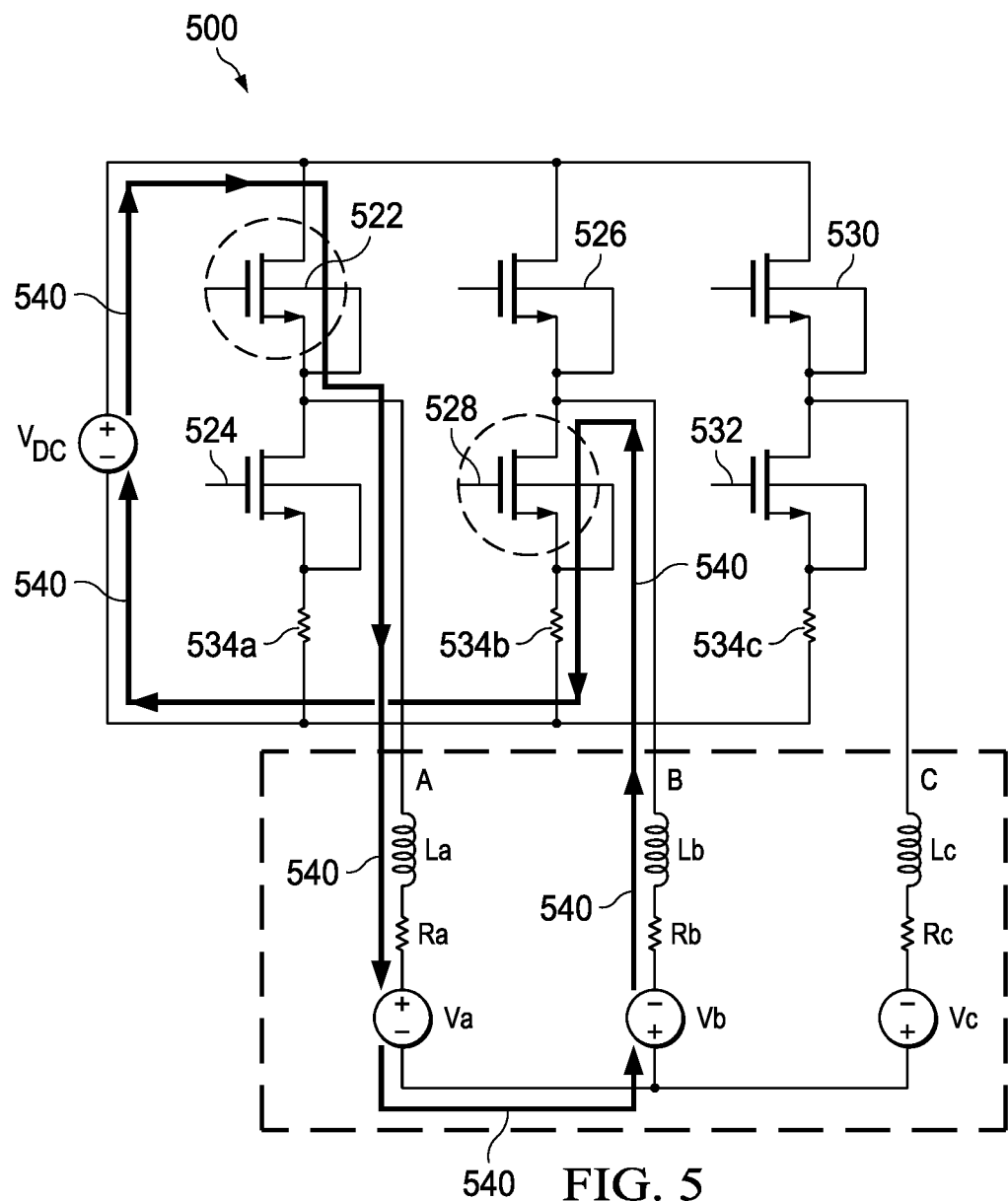
FIG. 5 is a schematic diagram illustrating the current conduction path for an $A\overline{B}$ commutation state in a normal motoring mode in the six-state commutation scheme.

Referring to FIG. 5, an equivalent circuit diagram of the system 500 is shown where the two transistors 522 and 528 that are activated or turned on (e.g., they are conducting) are highlighted via a dotted line, while the remaining transistors are all off (e.g., they are non-conducting). Accordingly, a current conduction path 540 exists according to the bold current path 540 in the direction of the arrows associated therewith. In this state, the peak motor winding current ($I_a$(pk.)) is limited (or opposed) by the phase back-EMF and is given by equation (1) below:

$$I_a(pk.) = \frac{V_{DC} - (V_a + V_b)}{R_a + R_b} \quad \text{Eqn. (1)}$$

Therefore, during motoring operation, the phase back-EMF limits the maximum current drawn by the motor windings or conversely, the motor reaches a speed (proportional to the back-EMF) dictated by $V_{DC}$, $R_a$ and the back-EMF constant.

During the motoring operation, the rate of change of the phase current (neglecting the drop across the motor phase resistances $R_a$, $R_b$) is as shown in equation (2):

$$\frac{dI_a}{dt} = \frac{V_{DC} - (V_a + V_b)}{L_a + L_b} \quad \text{Eqn. (2)}$$

In each commutation state of the six-state trapezoidal commutation scheme, only two of the three phases experience current conduction at a time to produce the motoring torque. Further, a rate of rotation of the rotor 202 is dictated by a duty cycle of the signal (e.g., pulse width modulation (PWM) signal) applied to the activated transistors. While the phase current may be used to estimate rotor position in a sensor-less implementation, position sensors, such as Hall sensors, alternatively may be employed to sense a position of the rotor 202 and operate to control a timing at which the motor control circuitry 102 transitions to the next commutation state. The next commutation state in this example is A$\bar{C}$, as shown at 404 in FIG. 4, and at 304 in FIG. 3. For each of the six commutation states, a letter without a "bar" above it indicates the top transistor for that respective phase bridge arm 220*n* is activated, and thus "on," and a letter with a "bar" above it indicates the bottom transistor for that respective phase bridge arm 220*n* is activated and thus "on." Thus the "next" state in the trapezoidal control scheme (i.e., the A$\bar{C}$ commutation state) indicates that transistor 522 of FIG. 5 (e.g., the top transistor of phase A) and transistor 532 of FIG. 5 (e.g., the bottom transistor of phase C) would be "on" while all the other transistors 524, 526, 528 and 530 would be "off." Note that FIG. 5 illustrates the A$\bar{B}$, but an explanation is provided simply to appreciate how the inverter circuitry of FIG. 5 would operationally change in a transition to the next commutation state A$\bar{C}$.

Therefore, as described above, a normal "motoring" mode of operation involves the motor system 100 of FIG. 1 transitioning between a predetermined sequence of commutation states, as shown in FIG. 4 (e.g. A$\bar{B}$, A$\bar{C}$, B$\bar{C}$, B$\bar{A}$, C$\bar{A}$, C$\bar{B}$, A$\bar{B}$, A$\bar{C}$ ...). The speed of the motor 112 in the motoring mode is dictated by the duty cycle applied to the inverter circuitry 104 for each of the commutation states, resulting in a change in the average current applied to each of the windings. Thus, a variable speed operation of three-phase BLDC or PMSM motors using inverters is employed for various applications, such as blowers, fans, power tools, fuel pumps, etc. In some applications, such as in a CPAP machine, for example, a rapid, controlled deceleration of the motor is desired. It should be noted, however, that the deceleration system and method of the present disclosure is not limited to any particular type of application, but can be employed in any deceleration application that finds a rapid, controlled deceleration advantageous. That is, in any application requiring a specified reduction in motor speed within a specified amount of time, as may be appreciated further below in the context of various examples.

Conventional braking techniques are unsatisfactory in providing rapid and controlled deceleration of a motor to a non-zero motor speed (i.e., not a complete braking of the motor, but instead a deceleration to a lower motor speed where the rotor is still rotating). The manner in which some example embodiments provide a rapid, controlled deceleration provides advantages over such conventional solutions will be more fully appreciated below in the context of the discussion of FIGS. 17*a*-17*d* after appreciating the details of the present disclosure.

Figure 6:
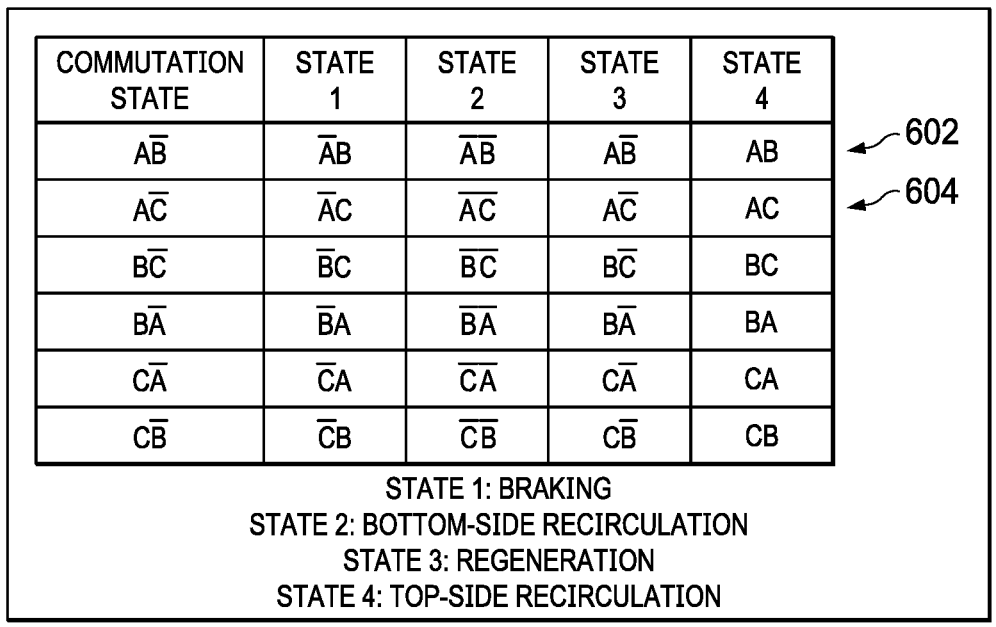
FIG. 6 is a table illustrating the 4-state cycling sequence for fast, controlled deceleration for each of the commutation states of a six-step commutation scheme.

One aspect of the present disclosure (i.e., a fast deceleration system and method) is, upon receipt of a rapid deceleration instruction, to apply a 2-phase voltage vector opposite to that of the present commutation state during the motoring mode of operation. This 2-phase voltage vector generates a motor winding current of polarity opposite to that of the present commutation state back-EMF, thereby resulting in negative or decelerating torque. Therefore, for a given commutation state in a trapezoidal motor operation (e.g., A$\bar{B}$), an opposite voltage vector ($\bar{A}$B) is applied to generate winding current of opposite polarity. This opposite voltage vector tends to increase the motor winding current rapidly. In some examples, the increasing motor winding current is recirculated within the inverter circuitry FETs to ensure there is no appreciable regenerative energy pump-back into the DC supply bus, and also to ensure that the current stays within pre-set safe limits for controlled deceleration. This is achieved by cycling repeatedly through a specific 4-state braking sequence (each state is a different 2-phase voltage vector) as shown in FIG. 6 for each of the six commutation states shown in FIG. 4.

Figure 7:
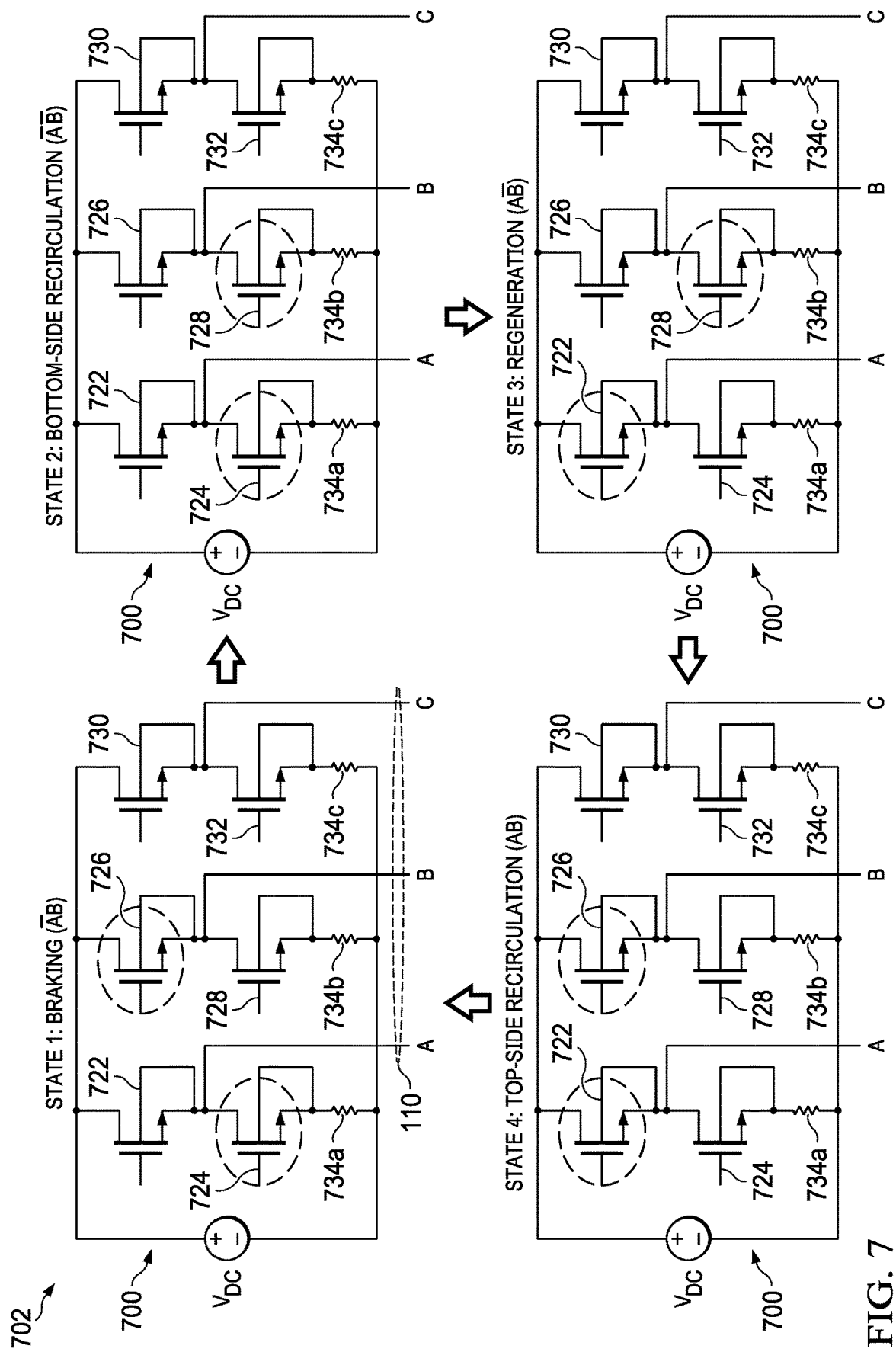
FIG. 7 is a schematic diagram illustrating the activated transistors for each of the four states of the fast, controlled deceleration cycling sequence for one of the commutation states of the six-state commutation scheme.

FIG. 7 illustrates schematically the 4-state cycling sequence (see FIG. 6 at reference numeral 602) employed in the inverter circuitry 704 for the particular commutation state A$\bar{B}$ to generate a controlled current for a fast deceleration. That is, if the motor control circuit 102 of motor system 100 receives a fast deceleration instruction at one or more of the input control inputs 106 while the inverter circuitry 704 (or circuitry 104 of FIG. 1) is presently providing signals 110 to the motor 112 and the motor is in the commutation state $A\overline{B}$, the 4-state cycling sequence 602 in FIG. 6, as shown in FIG. 7, will be performed and repeated until the sensed phase current, or position sensors, indicate to the motor control circuit 102 that the position of the rotor 114 has changed sufficiently so as to enter the next commutation state (see FIG. 4 at reference numeral 404), wherein the next commutation state is $A\overline{C}$. The motor control circuit 102 will then cycle through the 4-phase cycling sequence for commutation state $A\overline{C}$, as shown in FIG. 6 at 604. The motor control circuit 102 will continue cycling through this sequence 604 until the sensed phase current or motor position sensors indicate to transition to the next commutation state. Thus the motor control scheme of the present disclosure will continue respective 4-phase deceleration cycling sequences for each commutation state until the motor 112 has decreased down to the desired, reduced motor speed (i.e., the reduced motor speed target).

Figure 8:
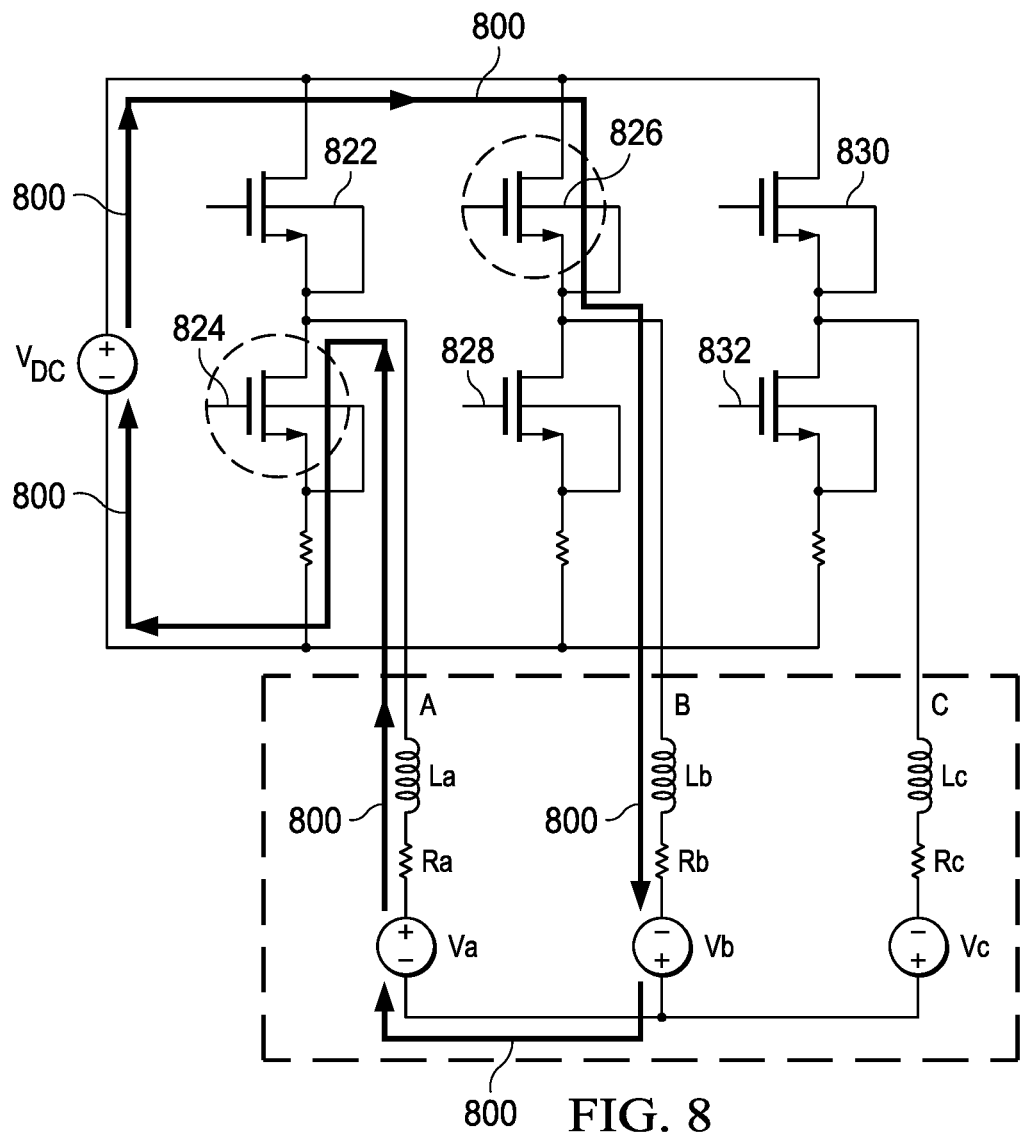
FIG. 8 is a schematic diagram illustrating the current conduction path in the inverter circuitry and motor for a braking state (state #1) of the 4-state deceleration cycling sequence.

Still referring to FIG. 7 and also to FIG. 8, state $\overline{A}B$ is the first state (i.e., state #1) in the 4-state deceleration cycling sequence following commutation state $A\overline{B}$ and is called the braking state 702. In this state, a motor phase voltage state opposite to that of the back-EMF is applied to effectuate a fast deceleration. As shown in FIG. 8 (which traces the current conduction path 800 for the inverter circuitry and motor) for state $\overline{A}B$, only the transistors 824 and 826, encircled in dotted lines (corresponding to the "bottom" transistor in phase A and the "top" transistor in phase B), are activated or "on" while the remaining transistors 822, 828, 830, and 832 are all deactivated, or "off."

In this state, the peak motor winding current is decided by the phase back-EMF in addition to the DC bus voltage $V_{DC}$ and is given by equation (3), $$I_a = \frac{V_{DC} + (V_a + V_b)}{R_a + R_b} \qquad \text{Eqn. (3)}$$

During this deceleration or braking state (i.e., state #1), the current change rate (neglecting the drop across $R_a$, $R_b$) is as shown in equation (4):

$$\frac{dI_a}{dt} = \frac{V_{DC} + (V_a + V_b)}{L_a + L_b} \qquad \text{Eqn. (4)}$$

Figure 9:
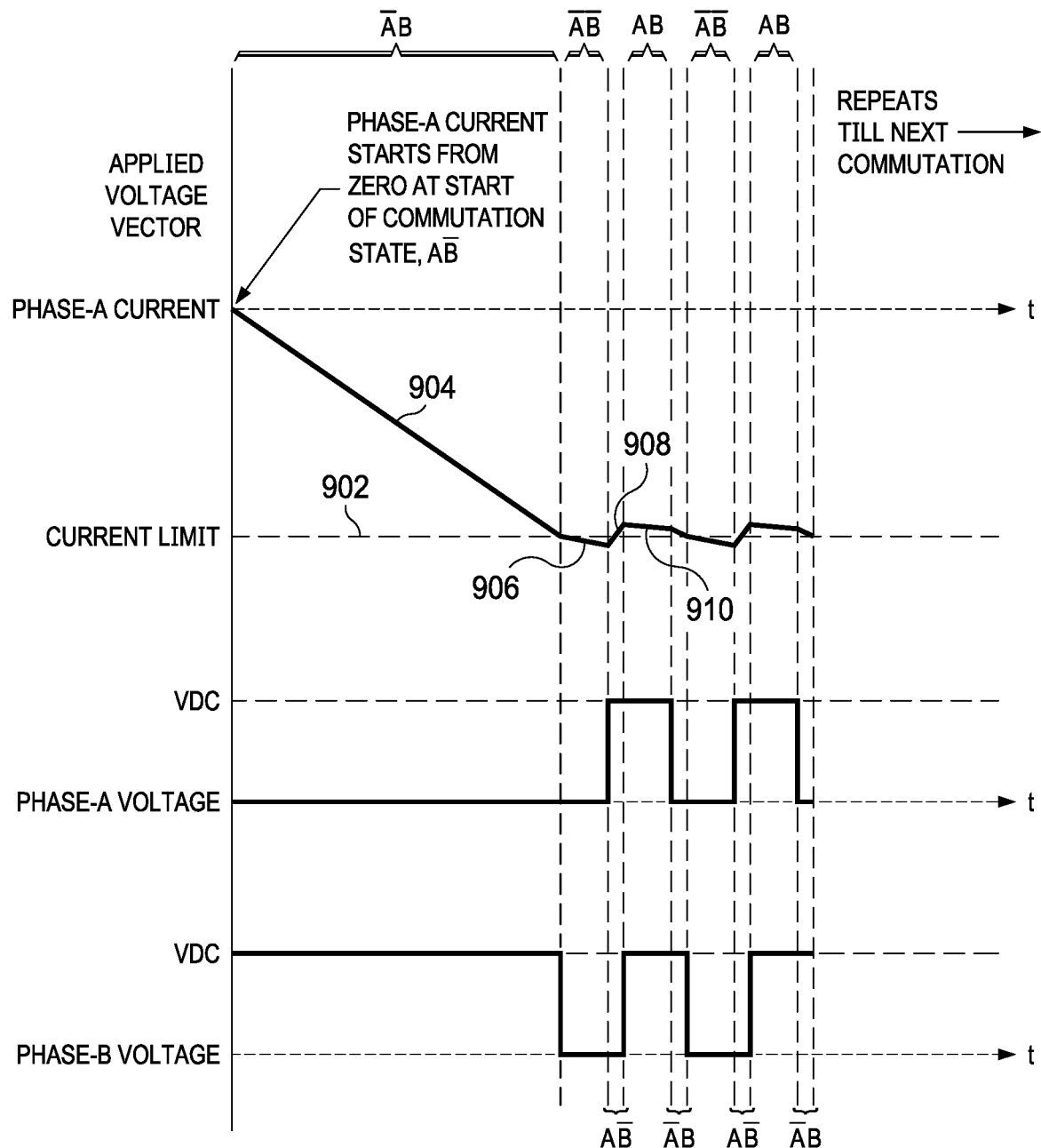
FIG. 9 is a waveform diagram illustrating current and voltage waveforms associated with the inverter circuitry and motor for each of the 4 states of the 4-state deceleration cycling sequence for one of the commutation states of the six-state commutation scheme.

So, during the fast deceleration operation, the peak motor winding current as well as the rate of change in phase current is decided by phase back-EMF in addition to the DC bus voltage. This results in a higher current during deceleration than during motoring operation as seen by comparing equations (1) and (3). In order to limit the decelerating current within a safe limit, the 2-phase voltage vector is not maintained at state #1 for the entire deceleration period, but instead is changed to state #2, $\overline{AB}$, when an upper limit or first threshold 902 (see FIG. 9) is reached and thus, in one example, triggers a phase A current comparator (not shown), which will be discussed in greater detail infra. This fast rate of change of current during state #1 is illustrated in FIG. 9 at 904.

Figure 10:
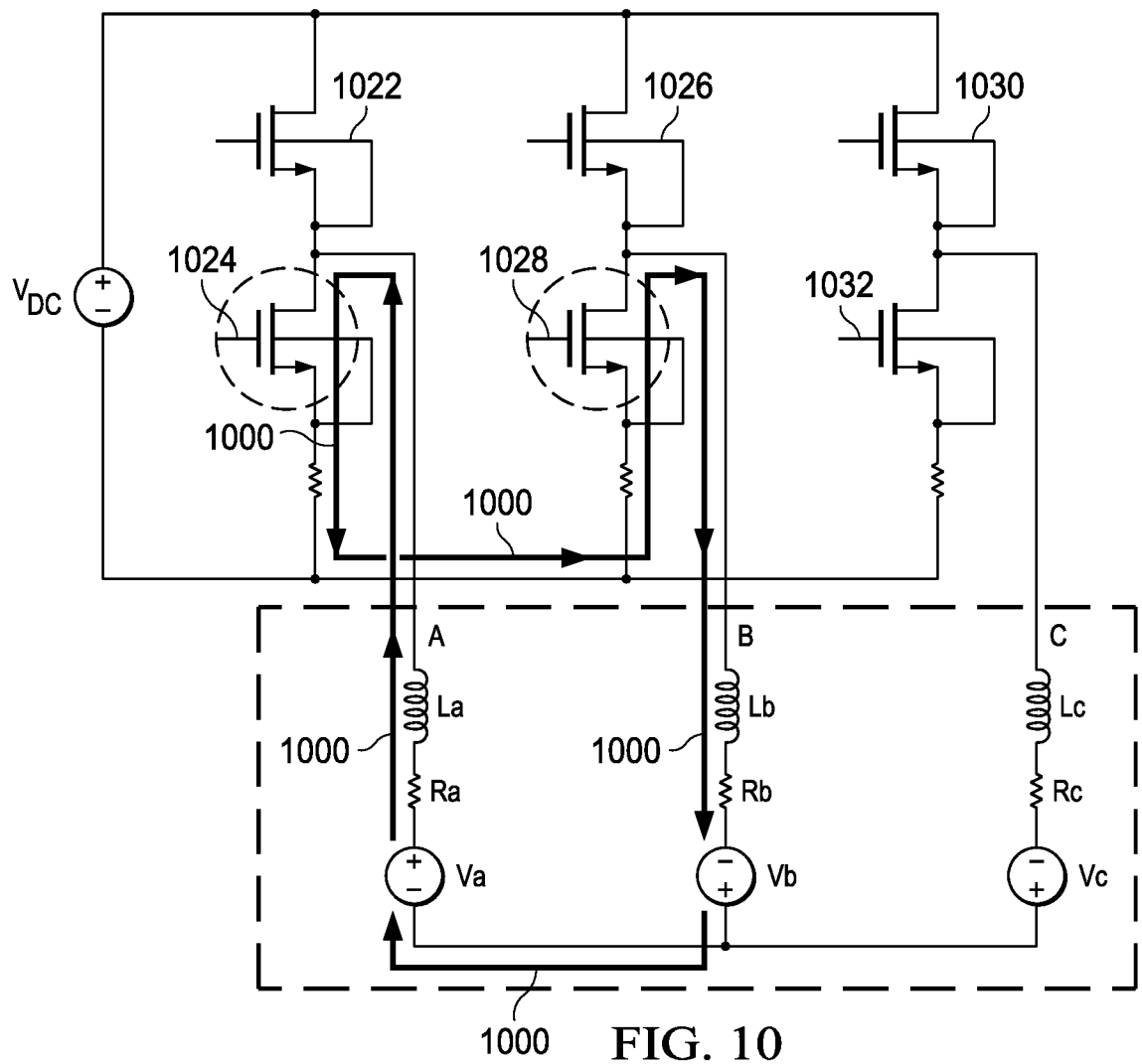
FIG. 10 is a schematic diagram illustrating the current conduction path in the inverter circuitry and motor for a bottom-side recirculation state (state #2) of the 4-state deceleration cycling sequence.

The new state #2 of the 4-state sequence in FIG. 7 is called the bottom-side recirculation state in one example of the disclosure. Referring also to FIG. 10, in this state #2 ($\overline{AB}$) both of the bottom transistors 1024 and 1028 in the phase A and phase B bridge arms circuits, respectively, are activated or "on," while all the other transistors 1022, 1026, 1030 and 1032 are deactivated, or "off." This changes the current conduction path to path 1000 as shown in FIG. 10. The phase current recirculates within the bottom transistors 1024 and 1028 and thus constitutes a bottom-side recirculation state. In this state, the motor winding current circulates within the bottom switches (e.g., the FETs) of phases A and B and increases only due to the phase back-EMF (that is, the rate of increase slows substantially over the braking state #1); the current change rate as shown at 906 (neglecting the drop across $R_a$, $R_b$) is given by equation (5):

$$\frac{dI_a}{dt} = \frac{(V_a + V_b)}{L_a + L_b} \qquad \text{Eqn. (5)}$$

Figure 11:
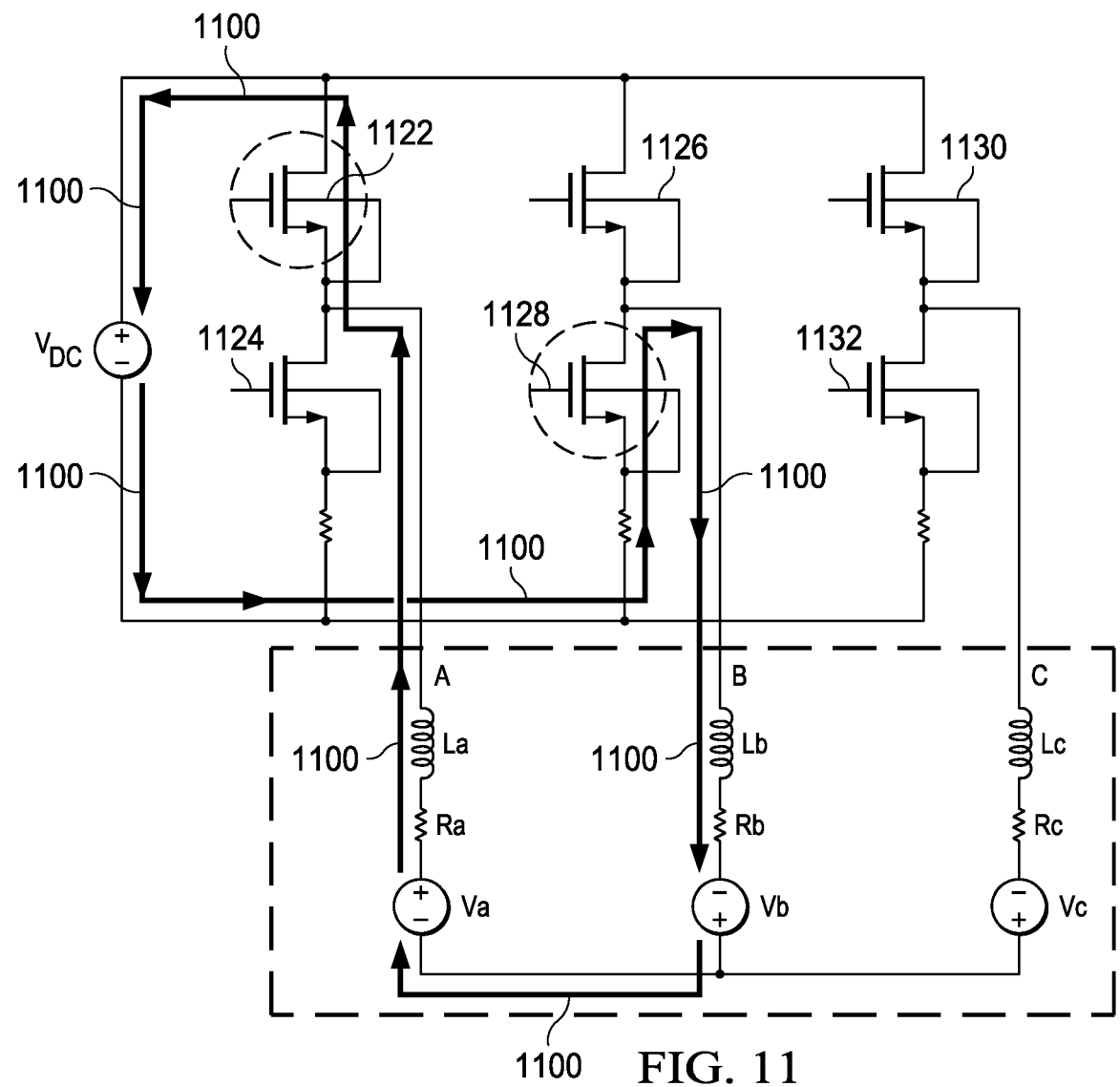
FIG. 11 is a schematic diagram illustrating the current conduction path in the inverter circuitry and motor for a regeneration state (state #3) of the 4-state deceleration cycling sequence.

The motor winding current is still at the upper limit level (e.g., the first threshold 902 of FIG. 9) and in one example this same limit level is employed as a second threshold, and thus triggers an upper limit on a phase-B current comparator (not shown). Consequently, by making the first and second thresholds in this example the same (the threshold level 902 of FIG. 9), the bottom-side recirculation state is quite brief (e.g., the time necessary for the motor control system to alter the 2-phase voltage vector and activate the proper switches in the inverter circuitry), and thus the motor control deceleration scheme rapidly changes the 2-phase voltage vector to State #3 (e.g. state $A\overline{B}$) of the 4-cycle sequence, as shown in FIG. 7. Alternatively, the second current threshold may be increased (in absolute value) to a value greater than the first current threshold based on various performance or customer requirements, thus extending this time duration of state #2, as long as the final deceleration speed is achieved within the specified time constraint. The new state #3 is defined by the 2-phase voltage vector $A\overline{B}$ which dictates that the top transistor 1122 in the phase A bridge arm circuit is activated, or "on," and the bottom transistor 1128 in the phase B bridge arm circuit activated, or "on" and all the remaining transistors, 1124, 1126, 1130 and 1132 are deactivated, or "off." The transition to state #3 changes the equivalent circuit of the inverter circuit and motor, and consequently the current conduction path as shown in FIG. 11 at reference numeral 1100, which is called the regeneration or regenerative stage.

In this regeneration state (i.e., state #3), the motor winding current goes back into the DC bus and thus the phase current decreases, as shown in FIG. 9 at 908 and shown more quantitatively per equation (6) (neglecting the drop across $R_a$, $R_b$):

$$\frac{dI_a}{dt} = \frac{(V_a + V_b) - V_{DC}}{L_a + L_b} \qquad \text{Eqn. (6)}$$

The algorithm or control routine of this example embodiment stays in State #3 for a fraction of the time compared to the time from for State #1 (to limit the current within a pre-set limit), and, therefore, there is negligible regenerative pump-back into the DC voltage supply causing uncontrolled voltage fluctuation to the DC voltage bus during fast deceleration using the proposed method. This extremely short duration of the state #3 is achieved in one example by setting a lower limit on a phase-A comparator (not shown), as the phase current is decreasing, to trigger immediately. In one example, this is done by setting the third threshold to the same value (see threshold value 902 of FIG. 9) as the second threshold (see the table herein), thus rapidly changing the 2-phase voltage vector to state #4 (e.g., state AB) of the 4-state sequence. State #4 is referred to as the top-side recirculation state. This state change changes the equivalent circuit and current conduction path of the inverter circuit and motor as shown in FIG. 12 at reference numeral 1200.

Figure 12:
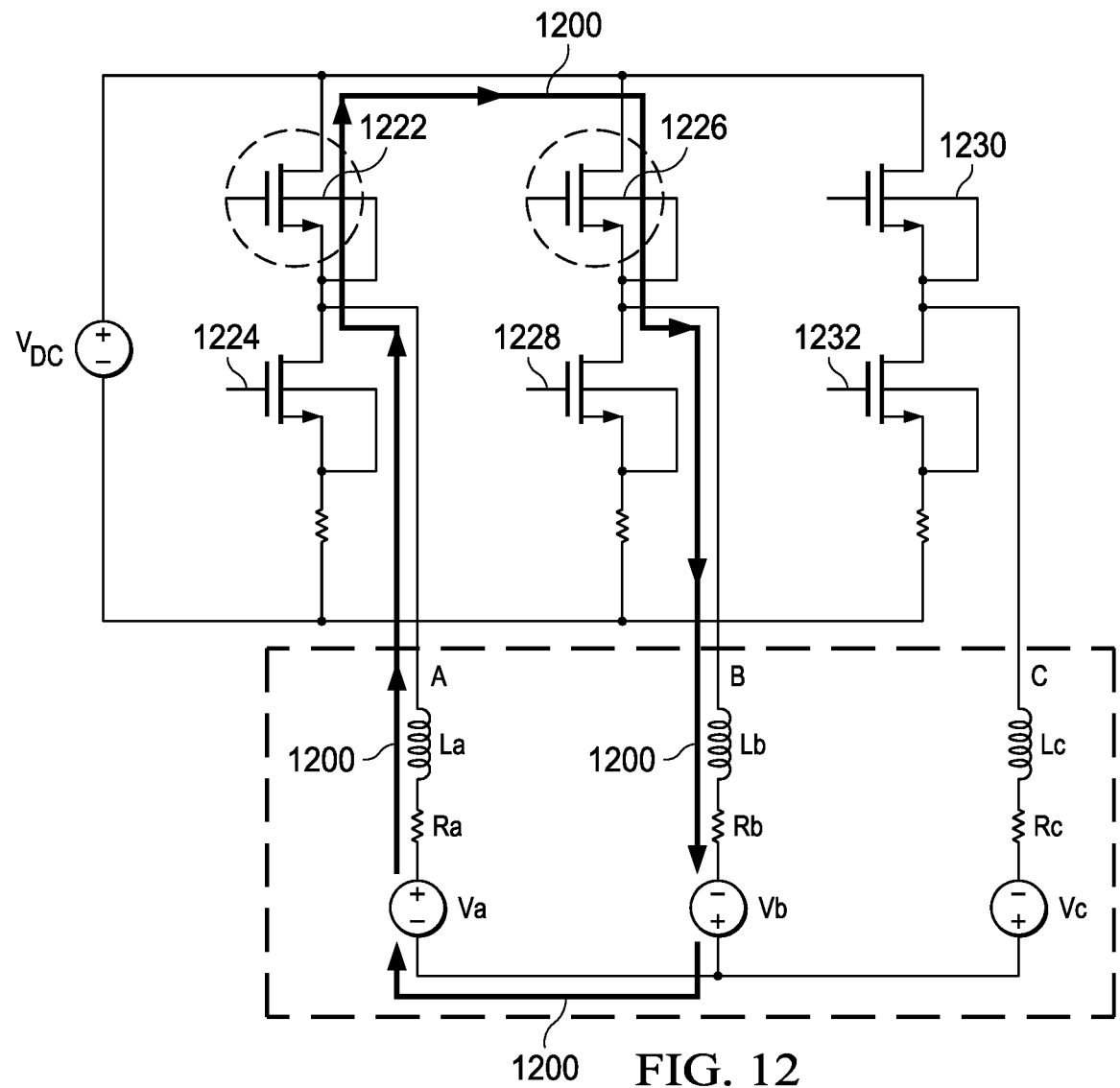
FIG. 12 is a schematic diagram illustrating the current conduction path in the inverter circuitry and motor for a top-side recirculation state (state #4) of the 4-state deceleration cycling sequence.

Referring to FIG. 12, with the 2-phase voltage vector being AB, the top transistors 1222 and 1226 in phases A and B are activated, or "on," while the other transistors 1224, 1228, 1230 and 1232 being deactivated, or "off." With the top transistors for the phases A and B activated, a top-side recirculation state is achieved, as shown by the current conduction path 1200. This State #4 is similar to State #2 in current change rate (e.g., an increase in current which differed from State #3) except that the currents recirculate within the top-side FETs 1222 and 1226 instead of bottom-side FETs 1224 and 1228 (see rate 910 of FIG. 9 which mimics the rate of state #2 at 906). The lower limit on a Phase-B comparator is then triggered (e.g., the fourth threshold as shown in the table), thus changing the 2-phase voltage vector back to State #1 ($\overline{AB}$) of the 4-state cycling sequence, and the cycle continues through the 4 deceleration states highlighted above until the phase back-EMFs change corresponding to the next commutation state, $A\overline{C}$ of the traditional trapezoidal motoring sequence. Once the $A\overline{C}$ commutation state starts, there is continuous cycling between state #1 through state #4 of the second row 604 in FIG. 6 until the deceleration process is completed and the standard motoring operation resumes at the lower target speed.

As discussed above, the change between each of the four states for each commutation state is triggered by a phase current reaching either an upper limit or a lower limit of a window comparator (not shown). This trigger based on current levels can be implemented either in hardware using a window comparator circuit in the motor control circuit 102 of FIG. 1 or in software using ADC sampled phase currents within or associated with the motor control circuit (e.g., using the resistors 234a-234c in the bridge arm circuits 220a-220c in FIG. 2 as sense resistors). The specific phase current limit events that trigger a state change for the each of the states in FIG. 6 can be selected according to various criteria, and any such criteria that provides for a rapid and generally linear deceleration of the motor is contemplated by the present disclosure. One example of four current thresholds used to implement the transition between the states of the 4-state cycling sequence is provided in the Table below:

| Commutation State | State #1 | State #2 | State #3 | State #4 |
|---|---|---|---|---|
| $A\overline{B}$ | $\overline{AB}$ | $\overline{A}B$ | $A\overline{B}$ | AB |
| Trigger Threshold | Threshold #1; Phase A Upper Limit | Threshold #2; Phase B Upper Limit | Threshold #3; Phase A Lower Limit | Threshold #4; Phase B Lower Limit |

From the Table above, it is seen by the generic use of the term "Threshold #n" that the present disclosure contemplates that each of the four trigger thresholds may differ from one another and may be selected to achieve particular performance objectives. For example, a particular relationship may be selected between the third and fourth thresholds in order to assure that the regenerative state (e.g., State #3) in which the current actually decreases and is pumped back toward the DC voltage supply is minimized in order to keep any voltage variation on the DC supply bus negligible.

In addition to the motor control system disclosed and described above, the disclosure also includes a method of decelerating a motor in a rapid, controlled fashion. The methods are illustrated and described above as a series of acts or events, but the illustrated ordering of such acts or events is not limiting. For example, some acts or events may occur in different orders and/or concurrently with other acts or events apart from those illustrated and/or described herein. Also, some illustrated acts or events are optional to implement one or more aspects or embodiments of this description. Further, one or more of the acts or events depicted herein may be performed in one or more separate acts and/or phases. In some embodiments, the methods described above may be implemented in a computer readable medium using instructions stored in a memory.

Figure 13:
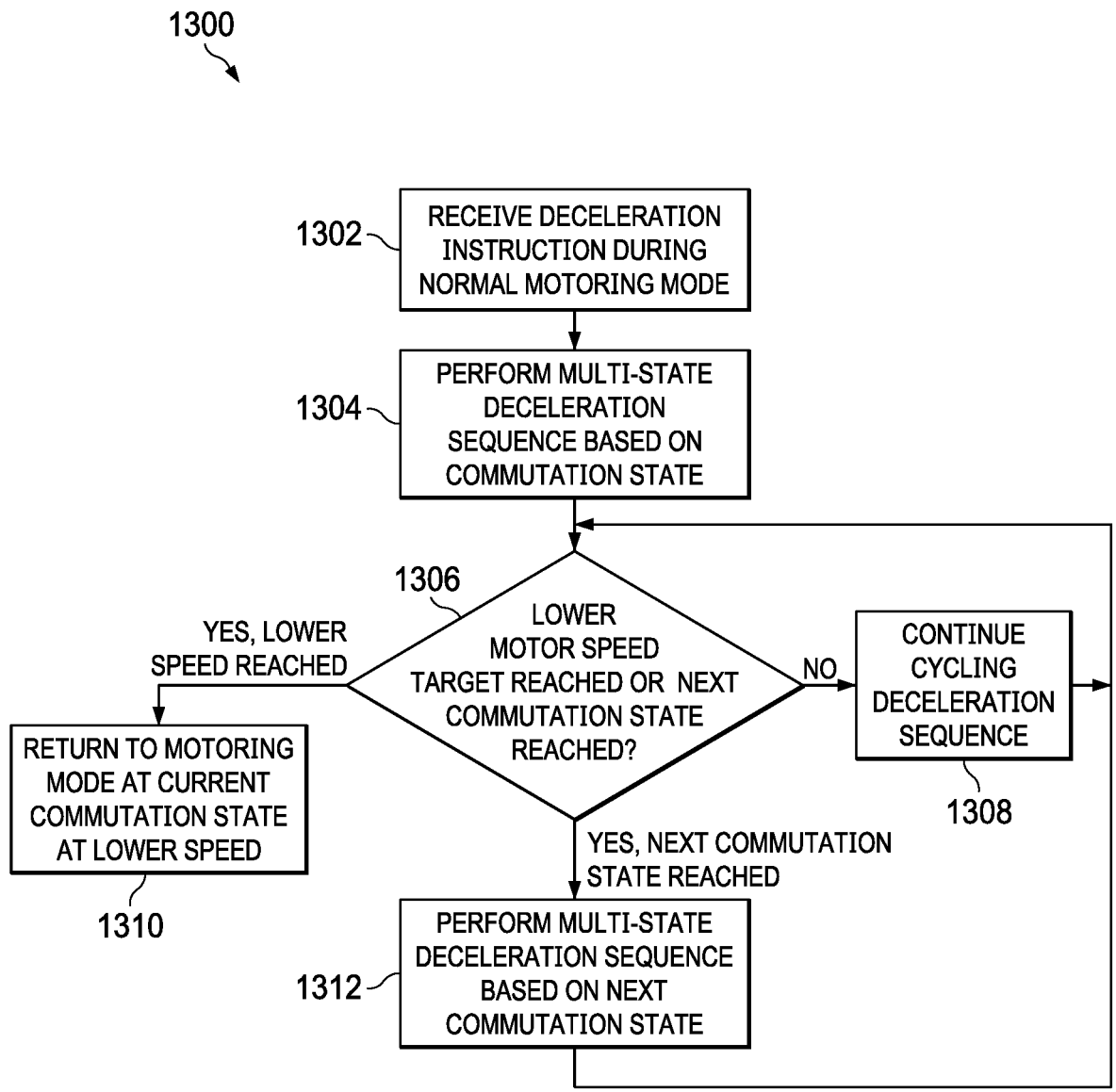
FIG. 13 is a flow chart diagram of an example method for decelerating a motor in a rapid controlled fashion.

Turning to FIG. 13, a method 1300 of decelerating a motor in a rapid, controlled fashion is illustrated in this example embodiment. In one example, the method 1300 may be implemented in a motor control system such as that illustrated and described in the FIGS. 1-12, however, the method 1300 is not so limited, and any motor control system implemented to effectuate the acts described herein is contemplated as falling within the scope of the present disclosure. The method 1300 begins at 1302 when, upon operating in a normal motoring mode (e.g., a six-state trapezoidal commutation scheme as described herein), a rapid deceleration instruction is received. In such instance, a multi-state deceleration sequence is initiated at 1304, wherein the specific multi-state deceleration sequence is dictated by a present commutation state of the six-state trapezoidal commutation scheme. For example, as illustrated in FIG. 6, if the present commutation state is $A\overline{B}$, the multi-state deceleration sequence set forth at reference numeral 602 is initiated. A query is made at 1306 whether either the desired lower motor speed target has been reached or whether a next commutation state (due to the rotor position) has been reached. If the answer is "NO" at 1306, the method 1300 proceeds to 1308 and the multi-state deceleration cycling sequence continues through each of the four states and repeats such sequence until the response to the query at 1306 is "YES". If the answer at 1306 is YES due to the deceleration motor speed target being reached, the deceleration method ends at 1310, and the six-state trapezoidal commutation motoring scheme continues at the current commutation state and at the new, lower motor speed. If the answer at 1306 is YES due to the next commutation state being reached due to the rotor position advancing past the next winding, the method 1300 proceeds with a multi-state deceleration sequence being employed for the next commutation state of the six-state trapezoidal commutation scheme, such as that illustrated in FIG. 6 at reference numeral 604. The method then continues as shown in FIG. 13 until the final, desired lower motor speed has been achieved.

Figure 14:
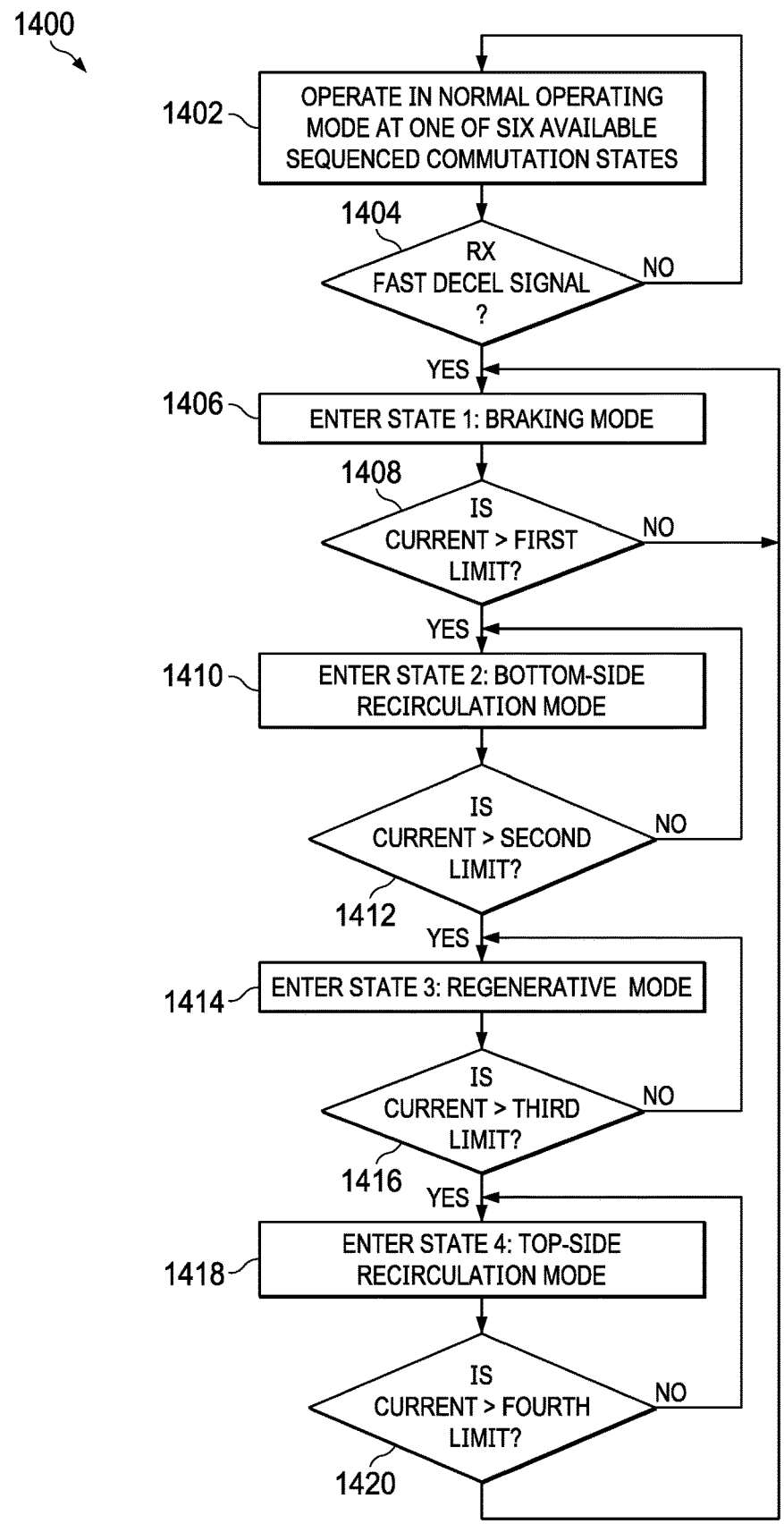
FIG. 14 is a flow diagram of an example method for performing a multi-state deceleration cycling sequence in accordance with the method of FIG. 13.

With reference to FIG. 14, details of one example of performing a multi-state deceleration sequence 1400 such as method step 1304 of FIG. 13 is provided below. The method 1400 starts with an initial condition at 1402, wherein a motor is operating in a "normal" mode (e.g., the motoring mode). As highlighted above, one example of such a mode is a six-state trapezoidal commutation scheme. During such motoring mode, the system (e.g. system 100 of FIG. 1) looks for receipt of one or more deceleration control signals or instructions at 1404 (for example, from a motor controller or an external source, such as a processor, state machine, digital circuitry and/or software). If no such signals are received (NO at 1404), the method continues at 1402, however, if such signals are received (YES at 1404), the method 1400 proceeds to 1406, wherein a rapid, controlled deceleration routine is initiated by entering state #1 of a multi-state deceleration cycling sequence. In one example, state #1 constitutes a braking mode as shown and described in conjunction with FIGS. 7 and 8. In one example, the braking mode (e.g., state #1) continues at 1406 until a detected phase current exceeds a first limit or threshold at 1408.

Upon the detected phase current exceeding the first threshold (YES at 1408), the method enters state #2 and operates in a bottom-side recirculation mode, for example, as illustrated in FIGS. 7 and 10. As shown in one example in FIG. 9, the rate of change in the increase of the phase current decreases (see, e.g., reference numeral at 906 having a reduced slope compared to reference numeral 904). The bottom-side recirculation mode continues at 1410 until a detected phase current exceeds a second limit or threshold at 1412. In one example, the second threshold may be the same as the first threshold. In such an instance, when looking at FIG. 9 at 906, the current exceeds the current limit 902, which may indicate that the second threshold is different than the first threshold, however, in this example, the further increase in phase current reflects an amount of time necessary to measure the phase current, make the comparison with the second threshold, issue a transition state instruction to the next state of the deceleration cycling sequence, and have the requisite transistors perform their switching. In the time it takes for these actions to occur, the phase current increases at the slower rate as shown at 906.

Once the second threshold is exceeded (YES at 1412), the method 1400 transitions to the next state of the deceleration cycling sequence (e.g., state #3) called the regeneration state at 1414. As illustrated in FIGS. 7 and 11, the regeneration state results in a decrease in the phase current, as illustrated at 908 of FIG. 9, as current is directed from the motor back into the inverter circuitry. As discussed above, this state is undesired if maintained for any appreciable period of time, as it can result in an uncontrolled DC supply bus voltage. Thus, the state #3 is transitioned promptly by making, in one example, the third threshold the same as the second threshold (YES at 1416). As shown in FIG. 9 at 908, as soon as state #3 is initiated, the reduction in phase current causes a crossing of the current limit 902, at which point only a short time duration exists before the deceleration cycling sequence transitions to a next state (e.g., state #4 at 1418).

The method 1400 performs a top-side recirculation operation at 1418, as illustrated in FIGS. 7 and 12. As shown in FIG. 9 at reference numeral 910, the current again increases at a rate about equal to the bottom-side recirculation mode at 906. This top-side recirculation state continues until a fourth current limit is exceeded (YES at 1420), at which time the deceleration cycling sequence transitions back to state #1 at 1406, as illustrated in FIG. 7. The multi-state deceleration cycling sequence is repeated until either the desired reduced motor speed is reached or until a rotor position is identified that indicates a next commutation state of the six-state trapezoidal commutation scheme has been reached. At such time, a multi-state deceleration cycling sequence for that unique commutation state is performed, as illustrated in FIGS. 4 and 6. This process repeats until the reduced motor speed has been reached, at which point the six-state trapezoidal commutation scheme is performed at a duty cycle appropriate for the reduced motor speed.

Figure 15:
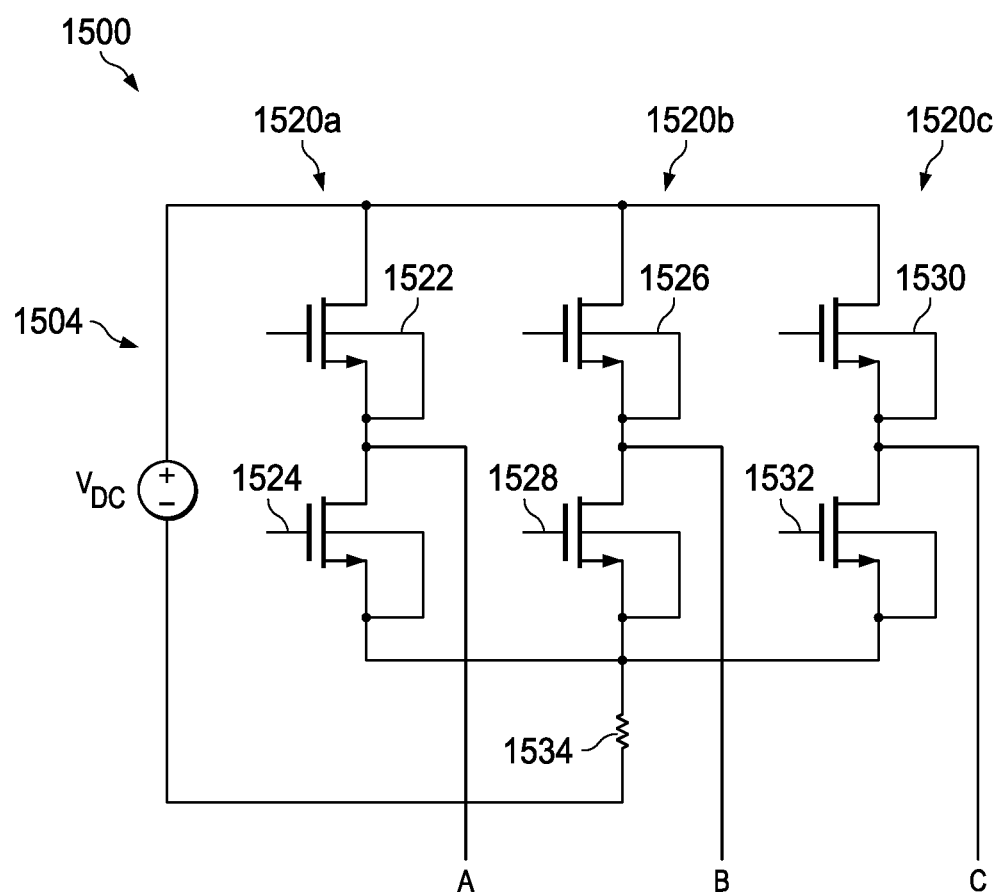
FIG. 15 is a schematic diagram illustrating a motor control circuitry component employing a single sense resistor for a three phases of the inverter circuitry.

FIG. 15 is a schematic diagram illustrating a single resistor sensing scheme instead of the multi-resistor sensing scheme illustrated in FIG. 2 and other related figures. FIG. 15 illustrates a circuit diagram 1500 of inverter circuitry 1504 (e.g., an implementation of inverter circuitry 104 of FIG. 1) that connects to a motor (not shown, for example, the motor 112 of FIG. 1), according to one example aspect of the disclosure. The inverter circuitry 1504, in one example, comprises three pairs of series-connected switches 1522 and 1524; 1526 and 1528; and 1530 and 1532 that each form a respective bridge arm 1520a, 1520b and 1520c that drives a respective phase A, B and C of the motor. In this instance, phase current measurements are still performed, but instead of three-shunt resistors to measure the three-phase currents, only one shunt resistor 1534 is used to measure the DC bus current. Based on the commutation state, this single current measurement can be used to trigger the current limit and state change during fast deceleration. FIG. 15 shows one implementation of the single-shunt (DC bus current) sensing. Alternatively, this sense element can be placed in the high-side (positive terminal) of $V_{DC}$ instead for the same illustration. In such an instance of a single current measurement solution, the thresholds employed for transitioning between the various states of the multi-state deceleration cycling sequence may be as follows:

| Commutation State | State #1 | State #2 | State #3 | State #4 |
|---|---|---|---|---|
| A$\overline{B}$ | $\overline{A}$B | $\overline{A}$B | A$\overline{B}$ | AB |
| Trigger Threshold | Threshold #1; DC Current Bus Upper Limit | Threshold #2; DC Current Bus Lower Limit | Threshold #3; DC Current Bus Upper Limit | Threshold #4; DC Current Bus Lower Limit |

While the table above is listed for one particular commutation states, similar thresholds may be employed for each of the six states of a trapezoidal commutation scheme.

As discussed above, the present disclosure is directed to a motor control system and method of performing a rapid, controlled deceleration of a motor using a multi-state deceleration cycling sequence for a given commutation state of a motoring commutation scheme such as a six-state trapezoidal commutation scheme. In FIG. 7, the multi-state deceleration cycling sequence is shown as a 4-state cycling sequence including: a braking state, a bottom-side recirculation state, a regeneration state, and a top-side recirculation state. These four states can be repeated multiple times for a given commutation state until either the desired reduced motor speed is obtained or until a rotor position is detected indicating a transition to the next motoring commutation state, wherein a 4-state deceleration cycling sequence is instituted for this new commutation state. In an alternative portion of this disclosure, the 4-state deceleration cycling sequence may be replaced with a 2-state deceleration cycling sequence, as illustrated in the waveform diagram of FIG. 16.

Figure 16:
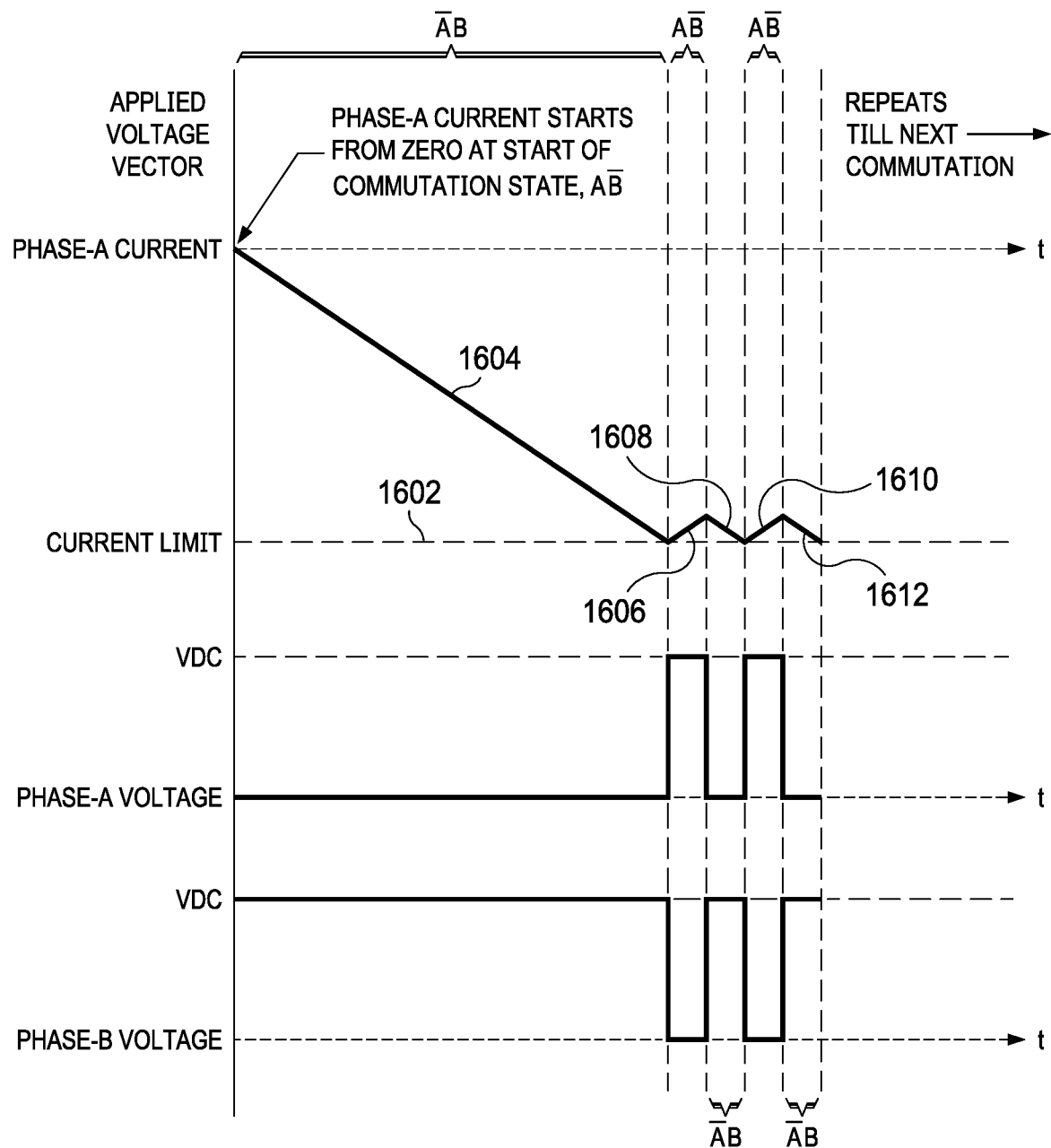
FIG. 16 is a waveform diagram illustrating current and voltage waveforms associated with the inverter circuitry and motor for each of the 2 states of a 2-state deceleration cycling sequence for one of the commutation states of the six-state commutation scheme.

In the 2-state deceleration cycling sequence, the motor control system begins at a braking state such as state #1 of FIG. 7, and the phase current rapidly increases at 1604 of FIG. 16 in the same manner as described before. As shown in FIG. 16, when the phase current increases above a first threshold such as the current limit 1602, the motor control scheme transitions to a next state, a regeneration state such as state #3 of FIG. 7, at which time the phase current actually decreases at 1606. Once the current falls below a lower threshold, such as the third threshold described previously, the motor control scheme transitions back to the braking state as shown at 1608 The deceleration routine then goes back and forth between states #1 and #3 of FIG. 7 at 1610, 1612, etc. until either the desired reduced motor speed is reached or a rotor position is detected that indicates a transition to the next motoring commutation state. The multi-state deceleration cycling sequence then continues at this next commutation state in a manner similar to that discussed before.

As highlighted above, the multi-state deceleration cycling sequence provides for a rapid, controlled deceleration of a three-phase motor, and provides various advantages over conventional braking solutions. For example, in some conventional braking solutions it is common for the DC supply bus voltage of the inverter circuitry to increase in an uncontrolled manner due to regenerative energy pump-back from motor inertia into DC bus capacitors (not shown). This requires higher voltage-rated capacitors, higher voltage motor driver electronics, etc., which undesirably increases the solution cost. Alternatively, uncontrolled DC supply bus voltages can damage lower voltage rated capacitors and driver electronics and, in some instances, result in severely degraded performance or even catastrophic failure. Other conventional motor braking solutions do not provide for a relatively linear, smooth braking effect due to uncontrolled winding current during the braking.

One conventional braking solution is known as single-ended, or asynchronous, PWM braking, and is shown in FIG. 17a. In this type of braking scheme, the PWM duty cycle in the motoring mode of operation is gradually reduced, thereby gradually reducing the speed of the motor. Because no negative winding current is employed, there is no braking torque applied to the motor. While the lack of braking torque, due to the speed reduction being due solely to a gradual reduction of PWM duty cycle, provides advantageously for no current surge during the deceleration interval, the duration of the deceleration interval, for example, the time to achieve a certain percentage reduction of motor speed (e.g., from 500 Hz to 50 Hz) is almost 1.8 seconds, and a rapid deceleration specification may need to be much faster (e.g., 10× faster.

Figure 17B:
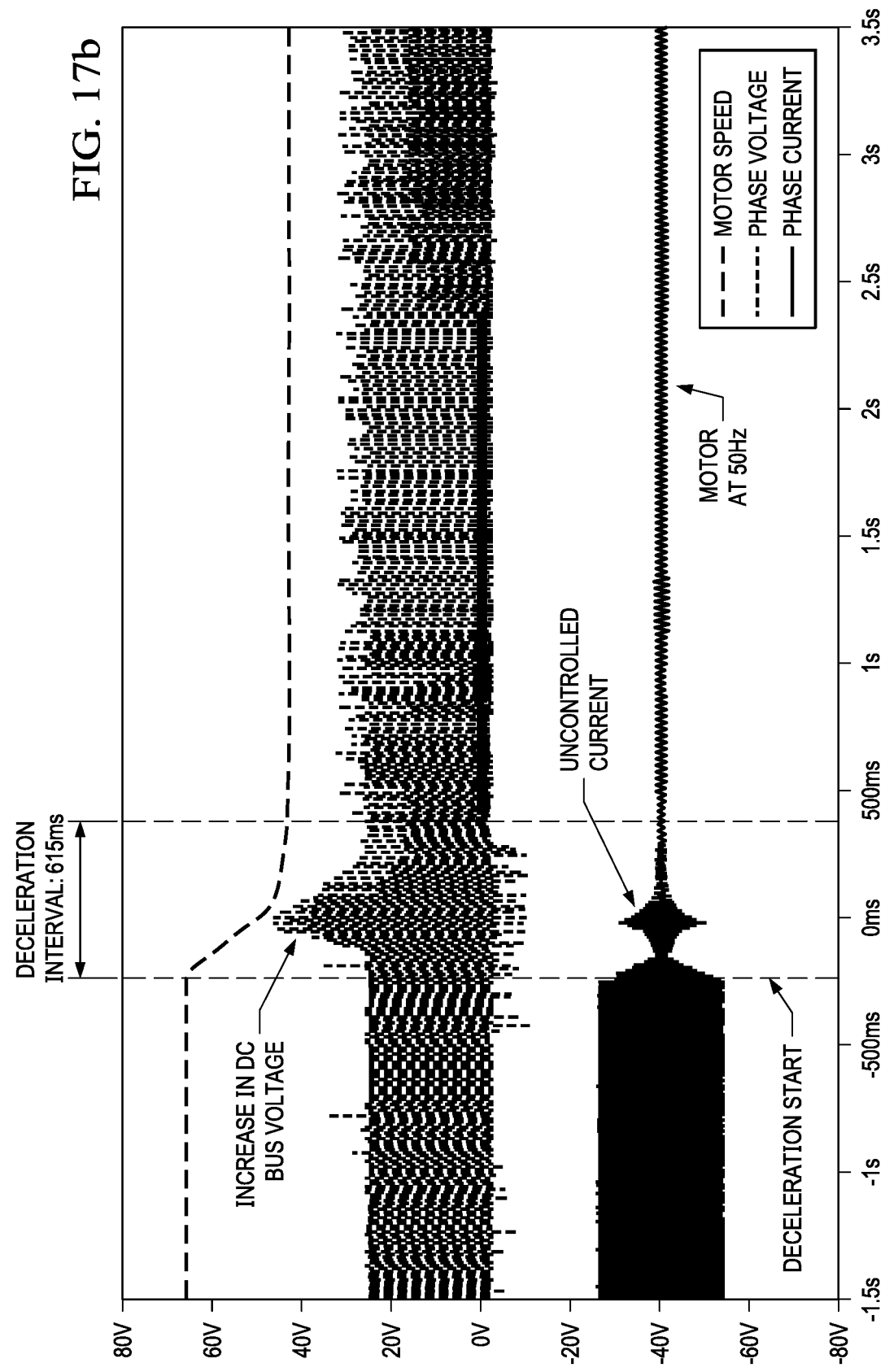
FIG. 17b is a waveform diagram illustrating waveforms associated with a complementary, synchronous, PWM deceleration technique.

Another conventional braking solution is known as complementary, or synchronous, PWM braking, as illustrated in FIG. 17b. Complementary PWM braking allows for negative (e.g., opposite polarity) current to generate braking torque. One disadvantage of this braking scheme is the uncontrolled DC supply bus voltage due to the negative current during deceleration which can result in damage to the switching transistors and/or capacitors. Further, the current is not controlled during braking and results in an uneven deceleration. Lastly, while the braking torque does provide for more rapid braking (e.g., about 615 ms) than the synchronous PWM braking technique, it still is not sufficiently rapid to meet the more stringent deceleration requirements, for example, a greater than 80% deceleration in less than 200 ms. In FIG. 17b, waveforms for the conventional complementary, or synchronous, PWM braking methodology are shown. By using complementary polarity, braking torque is generated which, as shown, helps to rapidly decelerate the motor. However, FIG. 17b shows a substantial spiking in the DC supply bus voltage due to the regenerative feedback which can damage the inverter circuitry or require much more expensive circuit components.

FIG. 17c illustrates a conventional hard braking technique that turns on all three bottom-side transistors in an inverter (e.g., transistors 524, 528 and 532 of FIG. 5) to bring the motor to an abrupt stop. As the waveforms of FIG. 17c show, the technique is effective in rapidly stopping the motor in about 120 ms, in one example. One benefit of the hard braking scheme is that the motor quickly decelerates to zero in about 120 ms, however, there is a significant surge in phase current since the phase back-EMFs are essentially short-circuited through the activated bottom inverter circuitry transistors. Such current surges are uncontrolled and can result in damage to the inverter circuitry components. In addition, the hard-braking technique reduces the motor speed all the way to zero (e.g., a complete stopping of the motor) and does not allow for a controlled, rapid deceleration down to a non-zero motor speed, which some applications may require.

FIG. 17d shows waveforms for the recirculation braking provided in the multi-state deceleration cycling sequence of the present disclosure. As seen in FIG. 17d, the deceleration interval is 150 ms, and there is no increase in DC supply bus voltage due to the minimal regeneration phase. While the phase current does increase due to the negative torque, the current is around half of the uncontrolled current spikes observed in the hard braking of FIG. 17c. Further, by setting the thresholds in the multi-state deceleration cycling sequence, this current can be further decreased in a user-configurable manner and balanced with the deceleration interval, for example, based on various different application requirements.

In this description, the term "couple" may cover connections, communications or signal paths that enable a functional relationship consistent with this description. Accordingly, if device A generates a signal to control device B to perform an action, then: (a) in a first example, device A is coupled directly to device B; or (b) in a second example, device A is coupled to device B through intervening component C if intervening component C does not substantially alter the functional relationship between device A and device B, so device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While some example embodiments suggest that certain elements are included in an integrated circuit while other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

Modifications are possible in the described examples, and other implementations are possible, within the scope of the claims.

What is claimed is:

1. A motor control system operable to control a motor, comprising:
   a motor control circuit; and
   an inverter circuit coupled to the motor control circuit, the inverter circuit having output terminals adapted to couple to the motor,
   wherein the inverter circuit, in response to one or more output control signals indicating a deceleration instruction from the motor control circuit, is configured to implement a multi-state deceleration sequence for at least one commutation state of a commutation scheme of the motor, wherein the multi-state deceleration sequence includes:
   a braking state;
   a bottom-side recirculation state implemented after the braking state
   a regeneration state implemented after the bottom-side recirculation state; and
   a top-side recirculation state implemented after the regeneration state.

2. The motor control system of claim 1, wherein the multi-state deceleration sequence is repeated for a given commutation state of the commutation scheme until a next commutation state of the commutation scheme is dictated by the motor control circuit or a predetermined reduced motor speed is detected by the motor control circuit.

3. A motor control system operable to control a motor, comprising:
   a motor control circuit; and
   an inverter circuit coupled to the motor control circuit, the inverter circuit having output terminals adapted to couple to the motor,
   wherein the inverter circuit, in response to one or more output control signals indicating a deceleration instruction from the motor control circuit, is configured to implement a multi-state deceleration sequence for at least a present commutation state of a commutation scheme of the motor, wherein when the present commutation state employs a 2-phase voltage vector of a first phase and a second phase of the motor from the motor control circuit to the inverter circuit in a motoring mode of operation, a braking state of the present commutation state employs a 2-phase voltage vector of the first phase and the second phase of the motor from the motor control circuit to the inverter circuit that is opposite of the 2-phase voltage vector in the motoring mode of operation.

4. A motor control system, comprising:
   a motor control circuit having output control terminals; and
   an inverter circuit
   including three bridge arm circuits coupled in parallel with one another and each having a phase output terminal adapted to couple to a respective phase winding of a three-phase motor, wherein each of the three bridge arm circuits includes a pair of series-connected switches having control terminals coupled to respective ones of the output control terminals of the motor control circuit,
   wherein the motor control circuit is configured to output control signals on the output control terminals to implement a multi-state deceleration cycling scheme for at least one commutation state of a normal motoring operation mode upon receipt of a deceleration instruction, wherein the multi-state deceleration cycling scheme includes a braking state and a regeneration state, wherein the braking state is implemented before the regeneration state, wherein the multi-state deceleration sequence further includes a bottom-side recirculation state implemented after the braking state and before the regeneration state and a top-side recirculation state implemented after the regeneration state.

5. The motor control system of claim 4, wherein a transition from the braking state is dictated by a sensed phase current of the motor exceeding a first predetermined threshold.

6. The motor control circuit of claim 4, wherein a transition from the bottom-side recirculation state to the regeneration state is dictated by a sensed phase current of the motor exceeding a second predetermined threshold.

7. The motor control circuit of claim 6, wherein a transition from the regeneration state to the top-side recirculation state is dictated by a sensed phase current of the motor exceeding a third predetermined threshold.

8. The motor control circuit of claim 7, wherein a transition from the top-side regeneration state to the braking state is dictated by a sensed phase current of the motor exceeding a fourth predetermined threshold.

9. The motor control circuit of claim 4, wherein the motor control circuit is configured to output control signals to implement a six-state trapezoidal commutation scheme in a motoring mode of operation, wherein each of the six states in the trapezoidal commutation scheme comprise a unique 2-phase voltage vector of a first phase and a second phase of the three-phase motor, wherein the braking state of a given commutation state employs a 2-phase voltage vector of the first phase and the second phase of the motor from the motor control circuit to the inverter circuit that is opposite of the 2-phase voltage vector of the given commutation state in the motoring mode of operation.

10. The motor control circuit of claim 9, wherein the motor control circuit is configured to output control signals to transition to a bottom-side recirculation state when a sensed phase current exceeds a first predetermined threshold, wherein the bottom-side recirculation state comprises output control signals from the motor control circuit that activate a bottom transistor in a first bridge arm circuit and a bottom transistor in a second bridge arm circuit of the inverter circuit to permit current recirculation between the activated bottom transistors and respective phase windings of the three-phase motor connected to respective phase output terminals of the inverter circuit.

11. The motor control circuit of claim 10, wherein the motor control circuit is configured to output control signals to transition from the bottom-side recirculation state to the regeneration state when a sensed phase current exceeds a second predetermined threshold, wherein the regeneration state comprises output control signals from the motor control circuit that activate the bottom transistor in second bridge arm circuit and a top transistor in a first bridge arm circuit of the inverter circuit, or output control signals from the motor control circuit that activate the bottom transistor in the first bridge arm circuit and a top transistor in the second bridge arm circuit of the inverter circuit depending on a commutation state of the normal motoring operation mode.

12. The motor control circuit of claim 11, wherein the motor control circuit is configured to output control signals to transition to a top-side recirculation state from the regeneration state when a sensed phase current exceeds a third predetermined threshold, wherein the top-side recirculation state comprises output control signals from the motor control circuit that activate the top transistor in the first bridge arm circuit and a top transistor in the second bridge arm circuit of the inverter circuit to permit current recirculation between the activated top transistors and respective phase windings of the three-phase motor connected to respective phase output terminals of the inverter circuit.

13. A method of decelerating a motor, comprising:
receiving a deceleration indication during a commutation state of a motoring mode of operation of the motor; and
performing a multi-state decelerating cycling sequence comprising multiple states as unique 2-phase voltage vectors based on the commutation state of the motoring mode of operation, wherein the multi-state deceleration cycling sequence comprises a braking state, followed by a bottom-side recirculation state, followed by a regeneration state, followed by a top-side recirculation state.

14. The method of claim 13, wherein a transition between states in the multi-state deceleration cycling sequence is dictated by a result of a detected motor phase current being compared to a respective threshold.

* * * * *